US006654729B1

(12) United States Patent
Hickman et al.

(10) Patent No.: US 6,654,729 B1
(45) Date of Patent: Nov. 25, 2003

(54) NEUROELECTRIC COMPUTATIONAL DEVICES AND NETWORKS

(75) Inventors: James J. Hickman, Pendleton, SC (US); Joseph J. Pancrazio, Germantown, MD (US)

(73) Assignee: Science Applications International Corporation, San Diego, CA (US)

( * ) Notice: Subject to any disclaimer, the term of this patent is extended or adjusted under 35 U.S.C. 154(b) by 0 days.

(21) Appl. No.: 09/927,746

(22) Filed: Aug. 9, 2001

Related U.S. Application Data

(63) Continuation of application No. 09/755,761, filed on Jan. 5, 2001, which is a continuation of application No. 09/551,949, filed on Apr. 19, 2000, now abandoned, which is a continuation of application No. 09/405,769, filed on Sep. 27, 1999, now abandoned.

(51) Int. Cl.[7] .................................................. G06N 3/02
(52) U.S. Cl. ........................... 706/15; 600/544; 607/46; 607/57
(58) Field of Search ........................... 706/15; 600/544; 607/46, 57; 700/251

(56) References Cited

U.S. PATENT DOCUMENTS

| | | | | |
|---|---|---|---|---|
| 4,232,680 A | * | 11/1980 | Hudleson et al. | 607/46 |
| RE31,031 E | * | 9/1982 | Kissiah, Jr. | 607/57 |
| 4,450,530 A | * | 5/1984 | Llinas et al. | 700/544 |
| 4,603,703 A | * | 8/1986 | McGill et al. | 600/544 |
| 6,011,991 A | * | 1/2000 | Mardirossian | 600/544 |

OTHER PUBLICATIONS

Sehmi, A.S.; Jones , N.B.; Wang, S.Q.; Loudon, G.H., Knowledge–based systems for neuroelectric signal processing, Science, Measurement and Technology, IEE Proceedings– , vol. 141 Issue 3 , May 1994, pp. 215–223.*

Schapiro, D., A neurointelligence: multisignificance images and neurocomputing, Neural Networks, 1991., IJCNN–91–Seattle International Joint Conference on, vol.: ii, Jul. 8–14, 1991, pp. 948 vol. 2.*

\* cited by examiner

Primary Examiner—Wilbert L. Starks, Jr.
(74) Attorney, Agent, or Firm—Sidley Austin Brown & Wood LLP

(57) ABSTRACT

A neuroelectric device is defined by a substrate having a neuronal cell provided thereon, a stimulator for the neuron, and a transducer for detecting a signal produced in the neuron. The neuronal cell is positioned on the substrate in a predefined orientation. The neuronal cell is conveniently oriented by providing a patterned self-assembled monolayer on the substrate. In a preferred embodiment, a capacitive transducer serves as the transducer and is capable of detecting a signal propagating in the neuron. A network of neuroelectric devices that defines a logic device also is contemplated, which includes a plurality of neurons each in electrical communication with another neuron. The neurons are provided in synaptic relationship so that a signal propagating in one neuron can be attenuated upon stimulation of another neuron.

15 Claims, 10 Drawing Sheets

MULTIPLE NEURONS FORMING A NETWORK

DUAL NEURON CIRCUIT
"INVERTER"

KEY: ▨ : STIMULATION SITE   ☐ : RECORDING SITE   ◁ : SYNAPSE
I: INHIBITORY NEURON   E: EXCITATORY NEURON

CORRESPONDING TRANSISTOR
CIRCUIT EQUIVALENT

KEY: ▓ : STIMULATION SITE  □ : RECORDING SITE  ◁ : SYNAPSE
     I: INHIBITORY NEURON   E: EXCITATORY NEURON

KEY: ▓ : STIMULATION SITE  □ : RECORDING SITE  ◁ : SYNAPSE
     I: INHIBITORY NEURON   E: EXCITATORY NEURON

KEY: ▨ : STIMULATION SITE  ☐ : RECORDING SITE  ◁ : SYNAPSE
I: INHIBITORY NEURON   E: EXCITATORY NEURON

KEY: ▨ : STIMULATION SITE  ☐ : RECORDING SITE  ◁ : SYNAPSE
I: INHIBITORY NEURON   E: EXCITATORY NEURON

NEUROELECTRIC COMPUTATIONAL DEVICES AND NETWORKS

CROSS REFERENCE TO RELATED APPLICATIONS

This application is a continuation of U.S. nonprovisional application 09/755,761, filed Jan. 5, 2001, which is continuation of U.S. nonprovisional application 09/551,949, filed Apr. 19, 2000, now abandoned which is a continuation of U.S. nonprovisional application 09/405,769, filed Sep. 27, 1999 now abandoned.

FIELD OF THE INVENTION

The present invention is related to hybrid to logic devices comprising biological and electrical components. The invention particularly relates to interfacing biological cells, such as neurons, with electrical circuitry.

BACKGROUND OF THE INVENTION

The concept of biological computing currently can be divided into at least four general approaches. The first of these are algorithms for neural networks based on schemes like backpropagation [Thimm et al., 1996; Erb, 1993]. These have seen wide use but are beginning to reach their limitations. The second approach involves promising new algorithms that utilize specific synaptic learning rules derived from cellular neurobiology and are now being developed for engineering applications [Granger et al. (1991); Ambrose-Ingerson et al. (1990)]. This olfactory-based algorithm substantially outperforms conventional Artificial Intelligence (AI) algorithms and neural networks in simulated space telemetry data having superimposed noise [Kowtha et al. (1995)] and in actual Specific Emitter Identification (SEI) using rigorous blind-test data in field conditions [Barrows et al. (1996)]. A third approach involves computation using DNA in a test tube [Adleman, L. (1994)] or possibly the manipulation of DNA in bacteria or other cells.

The limitation of these three approaches is that the system has order imposed on it from a predetermined pattern. However, if one could examine a reproducible system that controls the connections between living neurons, new paradigms in computing could be realized. Thus, a fourth approach involves the use of experiments on live animals, slice preparations, and in cultured networks [Gross, G. W. (1994)]. Many complicated and complex techniques have been developed to study neuronal networks in a living system using techniques such as MRI and PET, or in culture using dual patch-clamp and imaging systems. One of the difficulties arising from cultured networks is that the random spatial distributions and overlapping of dendrites and axons on homogeneous substrates in culture have historically made geometrically-dependent studies of synaptic function virtually impossible. The problem then becomes sorting out all of the complex connections and arrangements and making them reproducible. Consequently, a reductionist approach to this fourth method is desired which uses a minimum number of neurons to construct simple reproducible circuits and connect them to silicon devices. These new hybrid neuro-electric devices can then be connected in a multitude of configurations much like current computer chips without a predetermined hierarchial system.

SUMMARY OF THE INVENTION

The present invention is for neuroelectric components and logic devices which comprise one or more neurons having a predefined orientation on a substrate. One or more neural stimulating means, e.g., stimulator pads, electrodes, magnetic induction coils, and the like, are provided adjacent the neurons(s) and are capable of establishing a signal, e.g., an electrical signal therein. A transducer is provided adjacent at least one of the neurons and is capable of detecting the signal produced in the neuron. Typically, the neuronal cell(s) is/are hippocampal in origin.

It is preferred that the predefined orientation(s) of the neuron(s) on the substrate is/are set by the provision of a self-assembled monolayer (SAM) on the substrate in a predefined pattern, e.g., by providing a cell-repulsive surface at the periphery of the SAM. A particularly preferred self-assembled monolayer is composed of trimethoxysilylpropyl diethylene tetraamine (DETA), and a preferred cell-repulsive surface is provided by polyethylene glycol (molecular weight 550, i.e., $PEG_{550}$). Methods for providing a SAM on the surface of a substrate are described by the present inventors in U.S. Ser. No. 08/689,970, the disclosure of which is incorporated herein by reference.

A neuroelectric device of the invention preferably comprises a gigaohm seal provided between the neuron and the substrate, which facilitates detection of a signal, e.g., an electrical signal, in the neuron with the transducer. It is preferred that the substrate on which the neuron rests comprises a layer of silicon dioxide and/or a layer of silicon nitride.

The neural stimulation means of the invention is typically an electrode, although other means are contemplated as long as they can produce a detectable signal in the neuron. Thus, chemical agents, such as ion channel blockers, magnetic fields, and the like, which can generate and/or sustain an electrical signal in the neuron are contemplated. The signal produced in the neuron and detected by the transducer can be a membrane current, membrane voltage, action potential, and the like. The stimulator can be formed integrally with the substrate, e.g., as a stimulator pad integrated with the substrate, or can be provided separately, e.g., by directly contacting the neuron from a side opposite the substrate.

A transducer of the invention is capable of detecting a signal, e.g., an electrical signal, propagating in a neuron of an instant neuroelectric device. Exemplary of such transducer is a field effect transistor (FET) or microelectrode array. The transducer can be provided either integrally with the substrate, or can be contacted directly with the neuron independent of the substrate. The neuroelectric device can further comprise a patch clamp attached to the neuron for measuring transmembrane potentials thereof.

Also contemplated is a neuroelectric logic device that comprises more than one of the above-mentioned neuroelectric devices. The neurons can be excitatory or inhibitory in nature. In one device, two neurons are provided on a substrate, and stimulators are provided adjacent the neurons. The stimulators are each capable of establishing a signal in the neurons. A transducer is provided adjacent one of the neurons and is capable of detecting, e.g. capacitatively, the signal propagating in the neuron. Thus, the neurons are in synaptic relationship, i.e., a synapse is defined between the neurons so that a signal established in one neuron can be attenuated upon stimulation of the other neuron.

These and other aspects of the invention will become apparent upon a consideration of the invention as described in more detail hereinbelow.

BRIEF DESCRIPTION OF THE FIGURES

FIG. 4 shows quantitative simulations of two-neurons circuits using the program GENESIS.

DETAILED DESCRIPTION OF THE INVENTION

Figure 1:
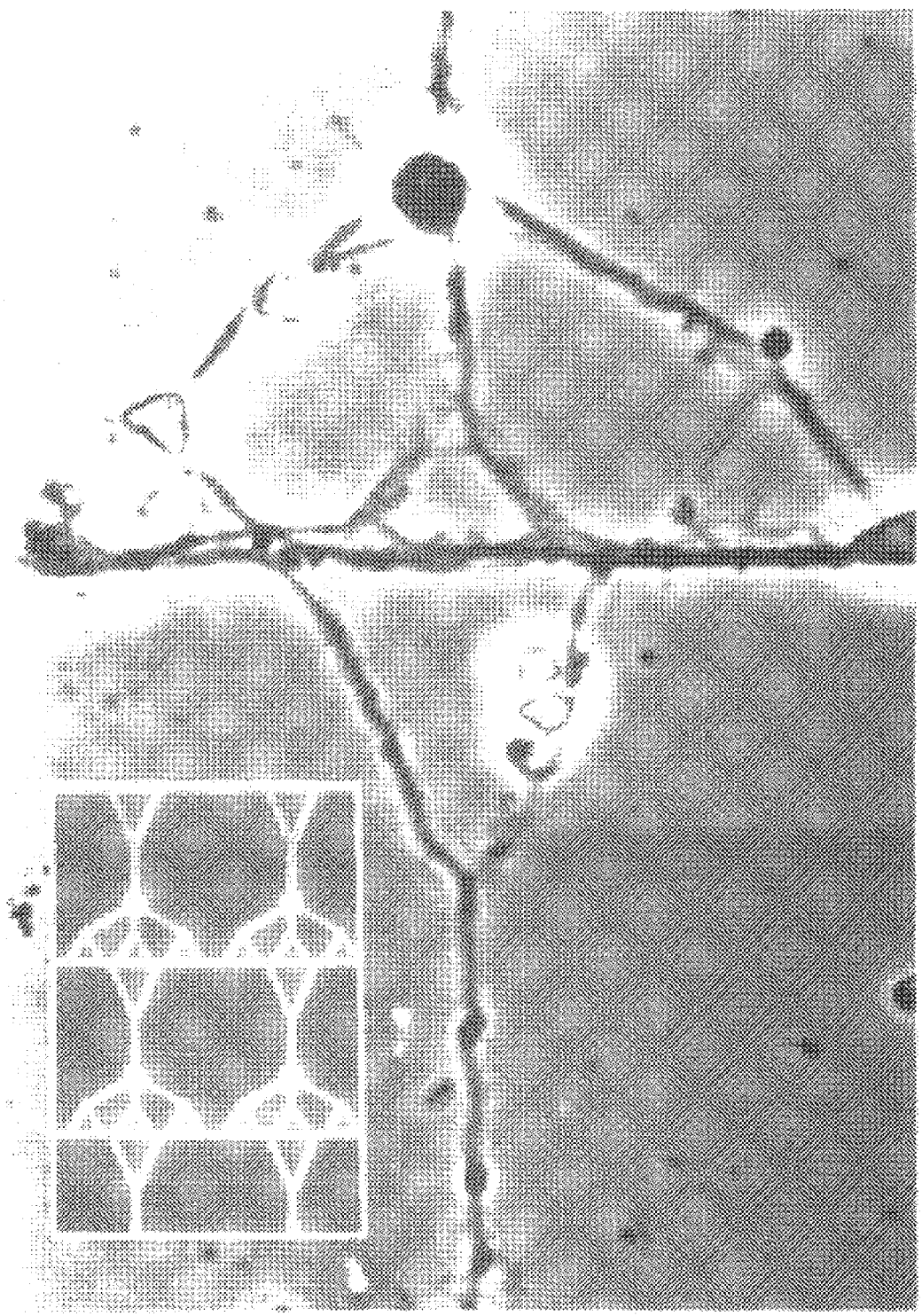
FIG. 1 depicts a high resolution pattern of DETA/13F with defined hippocampal neurons.

Development of the present invention has been facilitated by two new technology advances. First, a method to create artificial surfaces which enables the patterning of discrete cells and networks in culture has been developed. Second, the networks can be aligned with transducers. The tranducers have been designed to measure elecromagnetic fields (EMF) at low field strength. Combining these two advances permits the construction of a device that measures the EMF of neuronal cells and their processes.

The present approach to developing the instant hybrid neuroelectric device in many ways parallels the development of the early transistor. The first transistor involved combining two dissimilar systems: p-type germanium and n-type germanium, and taking advantage of the characteristics of the new device due to the interactions at the interface. Analogously, two dissimilar systems: a neuron and a FET or metal electrode can be brought together on a silicon chip, and the interface can be tailored to take advantage of the new device's characteristics.

The most difficult tasks in developing the fabrication protocol are controlling the placement of neurons and the processes, and the number of placement of synapse formations. In order to build a network composed of neurons in the preferred synaptic configuration, a high resolution surface pattern is required that guides the geometry and outgrowth of the elements of the circuit.

Self-Assembled Monolayers

It is known that the ability of neuronal processes to extend to their targets is dependent on adhesion to underlying substrata, which in vivo appears to be spatially and temporally patterned. The ability to culture mammalian neurons on patterned substrata would allow the investigation of the factors involved in basic circuit formation.

Patterning of surfaces to control growth of neurons and other cells in culture has been achieved by numerous investigators [(Cooper et al. (1976); Hammarback et al. (1985); Kleinfeld et at. (1988); Lom et al. (1988); Torimitsu and Kawana (1990); Corey et al. (1991); Stenger et al. (1992); Lopez et al. (1993); Singhvi et al. (1994); Curtis et al. (1994); Hickman et al. (1994); Whitesides et al. (1994)]. Most importantly, several photolithographic methods recently have emerged that allow high resolution patterning for biological applications.

Kleinfeld first reliably demonstrated that spinal cord and cerebellar neurons could be selectively adhered and confined to grow on patterns of self-assembled monolayers (SAMs) that were defined using conventional photolithography on silicon [Kleinfeld et al. (1988)]. The patterned cells developed electrical excitability and immunoreactivity for neuron-specific proteins.

A further modification of this technique eliminates the photoresist from this process and uses only SAMSs for the pattern formation. Neuroblastoma cells [Corey et al. (1991); Georger et al. (1992)] and, more recently, hippocampal neurons [Dulcey et al. (1991); Stenger et al. (1992); Matsuda et al. (1992); Hickman et al. (1994)] have been cultured in such patterns. Using neurons devices from the developing hippocampus is of particular interest in the studies discussed herein because the hippocampus is thought to play a central role in learning and memory function.

A SAM is a surface modifying layer composed of organic molecules, one molecule thick, that can spontaneously form strong interactions or covalent bonds with reactive groups on an exposed surface. The utilization of SAMs for modifying surfaces has been demonstrated on silicon dioxide [Hickman et al. (1994); Stenger et al. (1992)], biodegradable polymers [Hickman et al. (1992)], and other polymers such as Teflon® [Vargo et al. (1992)]. A large variety of functional groups or combination of functional groups can be located on the terminus opposite the attachment point of a SAM [Ulman, A. (1991)], and the chemical composition can be manipulated to systematically vary the surface free energy [Stenger et al. (1992)].

Most pertinently for the instant invention, the present inventors have successfully grown cells on SAMs, and SAMs can be used to geometrically pattern a surface [Stenger et al. (1992); Bhatia et al. (1992); Lom et al. (1993); Whitesides et al. (1994)]. SAMs thereby provide an ideal tool for the design of circuits or artificial surfaces for the studies of neuronal interactions.

Suitable substrates inclde silica (glass or quartz), $Si_3N_4$, noble metals such as gold and platinum, and the like. Reactive groups on the substrate can include —OH, —SH, —$NH_2$, —COOH, and the like. Silica, which has —OH surface reactive groups, is preferred because it has a substantially homogenous structure, is inexpensive, readily available, easily sterilized, non-toxic and stable in culture media. Glass cover slips and polished silicon wafers are examples of this substrate. Also preferred is a silicon nitride substrate.

Figure 2:
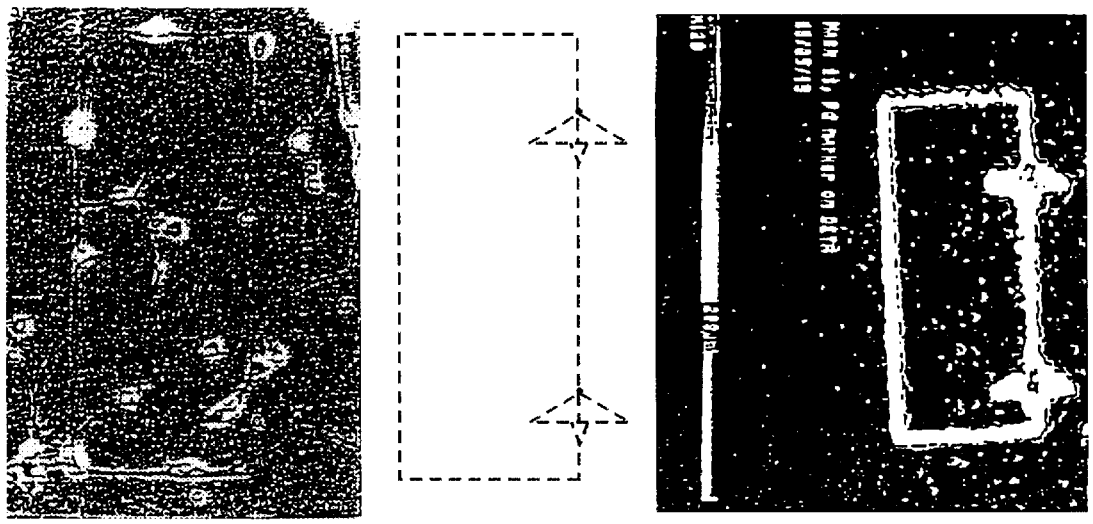
FIG. 2 depicts a high resolution pattern of hippocampal cells in a simple circuit in serum-free media showing the mask used and XPS analysis of the resultant pattern.

As shown in FIG. 1, rapid progress has been made from the preparation of low resolution patterns [Hickman et al. (1994)] to the design of high resolution patterns on the size scale of single cell bodies and processes. FIG. 2 shows the mask used in the present inventors' latest effort in high resolution patterning (middle), X-ray photoelectron spectroscopy (XPS) analysis of the surface modification (right), and hippocampal culture of the cells (left). Moreover, initial electrophysiological recordings suggest a geometry-mediated development of synaptic events.

Preparation of Defined Surface Patterns and Orientation of Neurons

A second important issue concerns the orientation of neurons once they are placed in the correct position. Much like an electronic transistor, not only the construction but the orientation of the device is critical for function. Banker showed that the longest neurite from a developing embryonic neuron would become the axon [Banker et al. (1977). The present inventors hypothesised that if the neurites were given many paths but "speedbumps" were placed on all but one path, this level of surface definition would be sufficient to make the unimpeded neurite the axon. A neuron plated on a mask pattern using DETA as the permissive surface and 13F as the repulsive surface, indicated that polarity is achieved by geometric means alone (results not shown). Accordingly, it is now possible not only to define placement of the cells but orientation of their processes as well. However, these results are for short-term cultures and may not be viable over longer periods, e.g., 2–3 months. This may necessitate the use of molecules attached to the SAMs that have been found to be necessary for process segregation during neuronal development in order to make long-term patterned substrates.

Utilization of biological developmental cues is made easily accessible because SAMs can be used as templates for the adhesion and patterning of biomolecules. It is known that there are many biomolecules found in the CNS that promote or inhibit axonal outgrowth. If difficulty is encountered in restricting cells to particular regions with just SAMs, molecules can be incorporated which have been shown to reduce neuronal attraction by repelling cells from specific surface regions. For example, tenascin has been shown to be repulsive to neurons and glia [Hynes et al. (1992)], and polysaccharides, the other major class of extracellular macromolecules [Nagai et al. (1988); Letourneau et al. (1992)] that comprise the extracellular matrix (ECM) and are usually bound to proteins, have been linked with inhibition of neurite outgrowth and adhesion [Friedlander et al. (1994)]. Preliminary results show that heparan sulfate (HS) can facilitate neurite outgrowth and survival of hippocampal neurons [Stenger et al. (1993)], yet HS is detrimental to the growth of endothelial cells [Spargo et al. (1994)]. Other classes of biomolecules affect neuronal proliferation, e.g., NCAM [Hynes et al. (1992)], neuronal survival, e.g., BDNF for cortical neurons [Ghosh et al. (1994); Jones et al. (1994)], and differentiation. The latter group includes albumin, which may play an important role in supporting the differentiation of embryonic cells [Dziegielewska et al. (1981); Adinolfi et al. (1977)]. The level of serum albumin in cerebral spinal fluid (CSF) drops significantly in postnatal development, thus suggesting an important role in neuronal development. Serum albumin is also a potentially useful molecule since it has been shown to prevent the non-specific adsorption of other proteins [Ligler et al. U.S. Pat. No. 5,077,210]. Also of interest is GABA, a neurotransmitter that has recently been shown to be a chemoattractant to neurons and their processes during development [Behar et al. (1994)].

To determine which molecules or surface formulations to use, it is important to understand what occurs at the interface using techniques in addition to those used for observing neuronal morphology. It is well known that proteins and other biological materials absorb onto a surface within minutes of exposure to bodily fluids [Pusineri et al. (1986); Vroman et al. (1977); Lee et al. (1988)]. It has been shown that the hydrophobicity or hydrophilicity of a surface can govern both the amount of protein adsorbed and the specific type [Hermansson et al. (1991)]. Analysis of these protein-surface interactions shows that surface hydrophobicity promotes the fast (within 1–3 minutes of contact) formation of an adsorbed protein layer, driven by thermodynamic forces [Brash, J. (1991); Fraaije et al. (1991)], and that hydrophilic surfaces adsorb proteins to a lesser degree. However, a slow re-organization takes place—known as the Vroman effect [Leonard and Vroman (1991)]—whereby other proteins respond to the modified surface. This is to some degree dependent on both the initial composition of the surface and the layer already deposited.

Model studies have shown that proteins demonstrate normal adsorption isotherms on surfaces, but tend to denature after adsorption [Vroman et al. (1977); Anderson et al. (1990); Goodmand et al. (1991); Baszkin et al. (19 adsorbed proteins denature they create new surfaces that adsorb materials differently and are inherently unstable. Denaturation after adsorption was clearly demonstrated in one recent study [Sandwick et al. (1988)] where enzyme activity was assayed at high and low enzyme coverage. Enzymes bound at low coverage were inactive and irreversibly bound to the surface, while the high coverage binding was reversible and the enzymes were active.

In an attempt to understand the surface, intermediate protein layer, and cell interactions, model surfaces have been pretreated with biological macromolecules and then assayed in vitro or in vivo for cell attachment [Ziats et al. (1988); Van Loosdrecht et al. (1990); Hubbel et al. (1991); Massia et al. (1991); Bonfield et al. (1992)]. Historically, the emphasis has been on results obtained by identifying the adsorbed proteins by radiolabeling or immunoassays. However, antibodies will only bind to the uppermost layer of material on the surface, and cannot reveal the underlying composition or whether stratification has occurred [Nisonoff, A. (1984)]. Recent advances in the field of quantitative surface analysis [Briggs et al. (1992)] provide complementary methods of quantifying the amount of material present on a surface.

The present method preferably uses surface modification to change the thermodynamics of adsorption and prevent protein denaturation. The fidelity of the surface modification is determined by imaging XPS analysis as well as quantitative protein adsorption using surface analytical techniques. The present inventors have used these techniques successfully to analyze cell culture surfaces both before and after culture and to relate the quantitative and qualitative results to cell morphology and survival [Schaffner et al. (1995)]. The primary techniques used are contact angle measurement and XPS. Contact angle determines the relative degree of hydrophobicity or hydrophilicity of a surface. This quantity can then be directly related to surface free energy. XPS is a technique for the characterization of the top 50–100 Å of surfaces that identifies elements, their oxidation states, and their relative amounts; absolute amounts can be determined if proper calibration is carried out. XPS also can be used to determine the thickness of an overlayer.

Quantitative surface analysis has permitted the present inventors to enjoy rapid progress enabling reproducible preparation of surfaces, and to quick identification of abnormal conditions, even those related to seemingly different variables. Previous studies have correlated cell behavior to initially quantified properties of the culture surface, i.e., prior to the addition of cells [Mateo et al. (1989); Baszkin et al. (1993); Stenger et al (1993)]. One study [Lewandowska et al. (1989)] examined the interaction of neuroblastoma cells with SAM-modified surfaces treated with proteins. Major differences were noted in cellular response, which were attributed to the different SAMs. However, the SAMs were only examined by XPS prior to the modification, not after protein interaction or cell culture. The present inventors have found that in order to correlate cell behavior to surface composition, one needs to analyze the surface before and after protein modification, and before and after cell culture. Many components of the culture medium adsorb onto the surface, and cells secrete ECM and soluble molecules. Many of these biomolecules are potential sources of the cell behavior assayed.

A key requirement to establishing this type of system with the circuits described herein, is that the neuronal cultures be in a defined environment. In order to determine how factors and modifications reproducibly affect a system, it is important to have as many conditions defined as possible. The use of serum-free media permits systematic investigation of optimal growth conditions for different neurons or combinations of neurons. To determine whether neurons can be cultured in serum-free growth media on the artificial surfaces, experiments were undertaken in collaboration with Dr. A. Schaffner at the National Institutes of Health (NIH) to systematically investigate the different conditions reported by several labs to sustain cell growth [Banker et al. (1977); Schaffner et al. (1987); Brewer et al. (1989); Strong et al. (1989)]. The effect of maintaining hippocampal neurons in serum-containing versus serum-free medium was studied, while varying the nature of the culture plate surface, dissociation method, and other factors. These studies established a good in vitro model for hippocampal culture [Schaffner et al. (1995)], and the present inventors have extended these results to obtain hippocampal neuron survival in serum-free conditions for at least one month on the artificial surfaces. Indeed, by analyzing the surface through all phases of modification, it is possible to establish a cell culture system in which the surface composition and geometry, growth medium, and cell preparation method are reproducible and defined [Schaffner et al. (1995); Hickman et al. (1944)]. The ability to define these characteristics permits the study of neuronal circuits in a controlled environment.

Electrical Circuitry and Transducers

The accurate spatial placement of a neuronal cell network affords the application of a wide spectrum of circuit and fabrication technology to the detection of signals transmitted within the network. Preliminary work elsewhere has demonstrated that FETs can detect membrane potential changes from cell bodies [Fromherz et al. (1991)]. Similar membrane potentials also occur in the connections between cells, i.e., synapses. An axon propagates its signal by transferring ions through channels in the axon membrane. Typically, $Na^+$ or $Ca^{2+}$ ions are transferred from outside the membrane to inside, followed some time later by the transfer of $K^+$ ions from inside to outside. Normally a potential difference exists between the inside and outside of the membrane on the order of tens of mV, with the inside being negatively charged relative to the outside. When the $Na^+$ or $Ca^{2+}$ channels open, this potential difference is momentarily absent.

Figure 3:
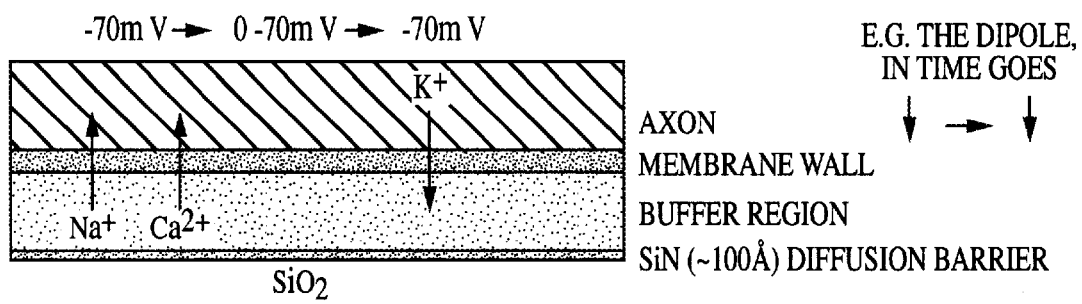
FIG. 3 is a schematic representation of an electrical signal propagating down an axon which is located atop a FET gate.

A few millisecond later, the $K^+$ channels open and the potential difference is reestablished. Electrically, this amounts to the amplitude oscillation of a dipole between the inside and outside of the membrane. This process is shown schematically in FIG. 3.

One way to measure such a dipole oscillation during a transmission down the axon is to use multiple FET pickups. These pickups are the gate electrodes of an insulated gate FET located on the neuronal axon. The detailed description of the FET performance and therefore circuit requirements is driven by those phenomena desired to be measured. These patterns and devices can be prepared on artificial surfaces as well as biological surfaces.

Along these lines membrane potentials and voltage-activated and ligand-activated ion channels of hippocampal neurons were measured with the neurons grown on an artificial surface (DETA), and a biological surface (poly-D-lysine). First, the gramicidin-perforated patch recordings were carried out on hippocampal neurons cultured at 1, 4, 6 and 10 days after plating to measure their resting membrane potential and polarization changes of GABA-induced responses. Results indicate that the neurons cultured on poly-D-lysine and DETA had no significant differences in the resting potential and polarization changes of GABA-induced responses. Second, a whole-cell configuration of the patch-clamp technique was used to compare $Na^+$ current induced by depolarization (voltage clamped from −80 to 0 mV) in hippocampal neurons cultured at 1, 4, 6 and 10 days. These results indicate that there is no significant difference in the magnitudes of sodium currents between neurons grown on poly-D-lysine and DETA. These results show that hippocampal neurons grown on these two different surfaces share similar electrophysiological properties such as excitability, voltage-gated and ligand-gated ion channels. These studies also indicate that neurons cultured on at least some of the artificial surfaces are comparable to those cultured on the commonly used poly-D-lysine surfaces that have been used for the bulk of the studies in vitro.

Designing a device using the FET based system is ideal for the patterned neuronal system but metal microelectrodes may be used in conjunction with or instead of FET's for certain applications. To fabricate this type of system, previous methods demonstrated for orthogonal self-assembly on two different metals [Hickman et al. (1992)], and on a surface consisting of a metal and an insulator coating region [Hickman et al. (1989); Laibinis et al. (1989)] can be used. For instance, a composite microstructure of interdigitated Au and Al electrodes was fabricated on an insulating $Si_3N_4$ surface [Hickman et al. (1991a)]. The microstructure was then placed in a solution containing a mixture of a dissolved thiol and a carboxylic acid. The two molecules segregated due solely to the differing reactivities of the dissolved molecules with the different surface components. The attachment of a 10–20 Å thick monolayer of material on the electrode surface served to change the surface free energy, as well as to provide a surface consisting of accessible functional groups.

Once the circuits are fabricated, standard physiological recordings (patch-clamp) can be employed while measuring the transmembrane potentials generated. The patch clamps can stimulate as well as record transmembrane potentials, so several signature frequencies can be isolated and used to monitor "normal" cell-cell communications. It is then possible to compare signals from neurons measured with standard electrophysiological techniques to the signals measured by transducers or pickups.

It is hypothesized that different results will be obtained based on the number and location of synapses, which will permit the fabrication of neuroelectric devices with distinct input-output relationships. To this end, preliminary simulations of simple two-neuron circuits were performed using the neural modeling program GENESIS [Wilson et al. (1989)]. In this model the interaction between an excitatory and an inhibitory neuron has been simulated. The practical implementation of such a circuit may require differentiation of excitatory neurons from inhibitory neurons from a mixed population, e.g., hippocampal tissue. While differentiation is not trivial, it is believed that this limitation can be overcome as discussed hereinbelow.

Figure 4A:
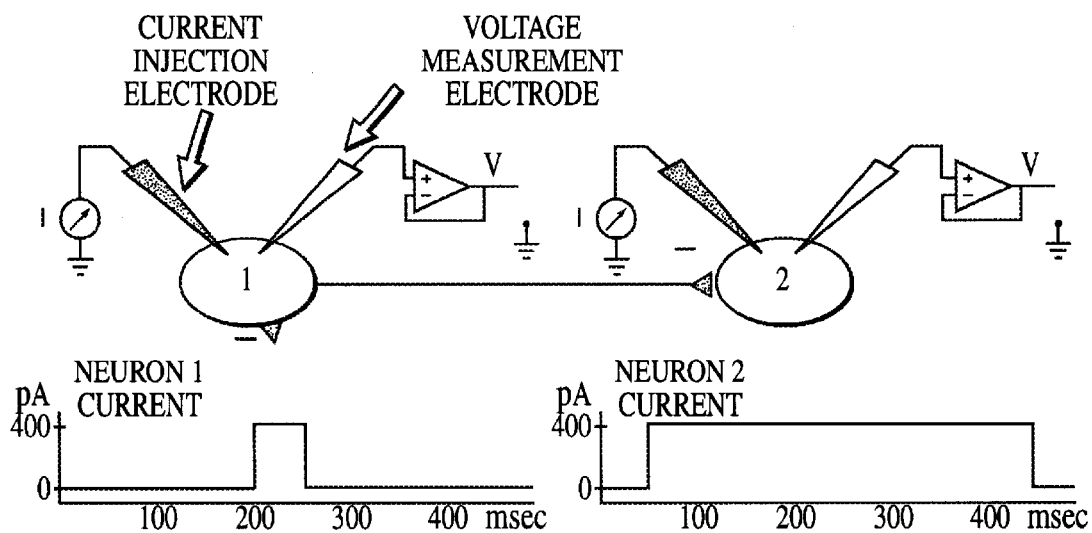
FIG. 4A shows a carton representation of the simulation conditions for neuron 1 connected by an inhibitory synapse to neuron 2 with pulsed soma current injections of 400 pA. Both neurons were assumed to be identical cylinders with length and diameter of the soma to be 30 $\mu$m and dendrites with length and diameter of 100 $\mu$m and 2 $\mu$m, respectively. The inhibitory synapses shown were coupled to the activation of a $K^+$ conductance and had a weight of 300 and delay of 5 msec.

For the sake of simplicity, both current injection and voltage measurements were performed at the soma of each neuron, as represented by microelectrodes in FIG. 4A. Furthermore, the electrophysiology of each identical neuron was implemented using the Hodgkin-Huxley equations, which provide for only voltage-activated $Na^+$ and $K^+$ conductances. GENESIS can allow for complex simulations using more accurate quantitative descriptions of hippocampal neurons [Traub et al. (1991)] as well as electrophysiological properties of dendrites and axons which may be representative of those networks observed in culture.

Figure 4B:
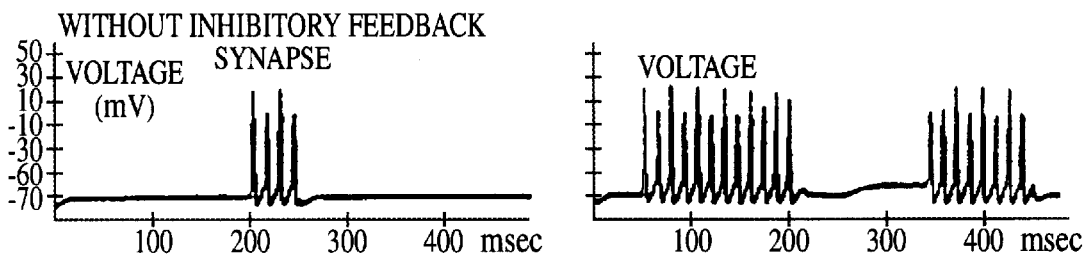
FIG. 4B shows a membrane voltage output in response to the current pulse paradigm for the two-neuron network with a single inhibitory synapse.
Figure 4C:
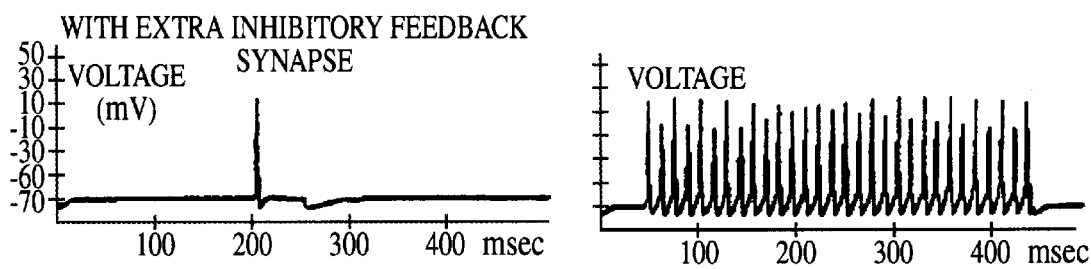
FIG. 4C shows a membrane voltage for the network with an additional inhibitory synapse. The inhibitory synaptic feedback loop depicted by the dotted line was active only for the simulation in FIG. 4C.

The effect of pulse excitation of the inhibitory neuron 1, which forms a synapse onto the soma of neuron 2, is depicted in FIG. 4B. During the period of current injection for neuron 2, spike behavior is apparent only during intervals where neuron 1 is not spiking. Interestingly, the behavior of this simple two-neuron circuit parallels that of a transistor inverter circuit where the input and output correspond to excitation of neuron 1 and membrane potential of neuron 2, respectively. To illustrate the concept of modification of the two-neuron network functionality by a new synapse, the addition of an inhibitory feedback synapse onto neuron 1 is simulated, as depicted by the dotted loop in FIG. 4A. With the additional synapse, excitation of neuron 1 is abruptly terminated and, for this set of current stimuli, the neurons are effectively decoupled and the information processing capability of the network is abolished (FIG. 4C).

Networks of Logic Devices

While the simulations depicted in FIG. 4 demonstrate behavior of a binary device, neuronal circuits such as these are capable of much more complex processing, including temporal integration of asynchronous inputs. Without wishing to be bound to any particular theory of operation, it is believed that two principal aspects of complexity will emerge using patterned neuronal circuits. First, synaptic connections may undergo long-term potentiation (LTP) or long-term depression (LTD), which require substantial and persistent postsynaptic activity [Artola (1987) and (1990)]. Thus, LTP or LTD would create use-dependent alterations in synaptic strength to affect information processing. Second, there is evidence for the use of graded rather than "all-or-nothing" action potentials to transmit information in many neurons [Juusola et al. (1996)] including cultured rat hippocampus [Johansson et al. (1990)]. As a result, the action potential amplitude may carry information on stimulus strength, thus providing the basis for a principle in the mammalian nervous system for multi-level logic.

The invention will now be described with respect to certain preferred embodiments which illustrate, but do not limit, the invention.

PREFERRED EMBODIMENTS

I. Patterning for fidelity and longevity of neurons

Initial experiments are designed to identify appropriate SAM surface which will support the long term growth and survival of neurons, e.g., E18 hippocampal neurons. The assembly of different silanes on silica (glass) surfaces was investigated including EDA, DETA, MTS, and PEDA, and they were found to be suitable for short term (<1 month) culture. These can be tested in serum-free medium with additive combinations to investigate their use for long term survival of both excitatory and inhibitory hippocampal neurons. Silicon or $Si_3N_4$ can be used as the substrate since Si provides a unique signal for XPS, and it is easy to visualize cells plated on glass. It is necessary to promote both neuronal phenotypes because the patterning strategies involve the incorporation of inhibitory neuronal connections in vitro. Inhibitory neuronal connections are formed in a controlled manner in developing cortical brain tissues. A common class of inhibitory neurons in the CNS release the neurotransmitter γ-aminobutyric acid (GABA), which causes localized hyperpolarization of postsynaptic membranes through several mechanisms [DeLorey et al. (1994)]. The observation of excitatory connections between cultured hippocampal neurons has been well-documented. However, inhibitory connections in hippocampal cell cultures have been observed with much less frequency.

Figure 7A:
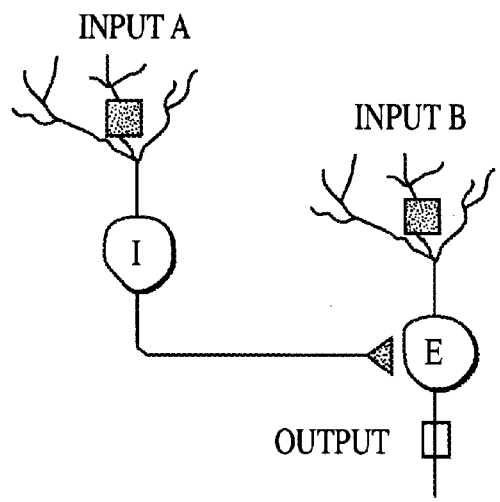
FIG. 7 illustrates a circuit model (A) according to the principles of the present invention, and a corresponding transistor logic circuit (B).

Work has been that embryonic GABA-ergic neurons isolated from rat hippocampus are the first to die unless special precautions are taken to promote their survival. Genetically-engineered ciliary neurotrophic factor (CNTF) was shown to substantially enhance the longevity of GABA-ergic hippocampal neurons [Ip et al. (1991)]. If necessary, it may be desired to isolate the GABA-ergic subpopulation by the buoyant density technique [Maric et al. (1994)]. Together, these approaches point to the feasibility of forming the types of connections shown in FIGS. 7 and 8.

One important factor to consider when practicing the present invention is the media supplement used to promote increased survival of hippocampal neurons. Examples include: (1) the cognition-enhancing drug tenilsetam which is a potent inhibitor of advance glycosylation end product formation; (2) specific calpain inhibitors which have been shown to block neuronal cell death in vitro and in vivo; (3) specific inhibitors of ICE-like proteases which are required for programmed cell death (apoptosis) to occur; and (4) elevated levels of potassium in the culture medium, which has been shown to promote neuronal survival by increasing intracellular calcium. Promising results with any of these candidates should be combined with "standard" conditions to assess overall effects on phenotype and longevity.

A second factor involves the use of molecular biology approaches to increase neuronal longevity in culture, either through the use of established transgenic models or by stable transfection of neurons with genes known to block cell death (i.e., Bcl-2, Bcl-x and CrmA) or by knockout protocols of genes associated with induction of cell death (i.e., p53 and dominant negative mutants of c-Jun). In this regard, Cotman has recently demonstrated that it is feasible to transfect primary neurons and have generated stable transfected neuronal cell lines overexpressing genes involved in programmed cell death [Anderson et al. 1995]. These techniques can be applied to the development of neurons with extended lifetimes in culture.

Initially, neurons are cultured on homogeneous surfaces, i.e., prior to patterning. The neurons are then characterized morphologically, immunocytochemically, and by electrophysiological recordings to evaluate growth, transmitter, and epitope expression. Taken together, these data are used to evaluate the effect of each SAM-modified surface on cell growth and development and to generate baseline data for advanced systems. A poly-D-lysine (PL) standard can be run for each experiment to assess the general health of the original cell suspension in the event that there is an immediate and considerable loss of cells in vitro.

a. Cell culture on patterned surfaces

Since some SAMs suitable for neuronal growth and survival have already been identified, patterned surfaces can be prepared and the effect of different media combinations on cultured neurons can be assessed for directed growth. Pattern fidelity experiments can be along the lines of our previous microlithographic procedures [Hickman et al. (1994)], or other options for patterning can be explored. The most promising of these new methodologies is the stamping method [Singhvi et al. (1994)]. This is a simple process where a template is created on a polymer surface and used to transfer a silan monolayer to a substrate for reaction; the second monolayer can then be adsorbed in the non-stamped areas. Patterning requires creating regions where neurons will not grow, and four SAMs that do not promote short term cell growth, i.e., TP, OTS, PEDA, and 13F, are preferred. Long-term survival on these surfaces is not expected but if it does occur, other SAMs containing aromatic groups or otherwise exhibiting high contact angles can be examined to find promising candidates for the pattern component that will effectively prevent neuron adhesion.

Embryonc hippocampal neurons can then be cultured on patterned surfaces to determine fidelity to the patterns, i.e., whether or not the neurites follow the designated paths. Phase microscopy can be used to assess which SAM combination result in specifically placed cell bodies and appropriate neurite extension along the desired pathways. These neurons can also be characterized immunocytochemically to determine phenotype. If pattern fidelity is a problem for certain SAMs, concentrations of soluble factors in the growth media, such as BSA or other components listed above, can be varied. If improvements are noted, the neuronal phenotype can be re-characterized.

Another control experiment can be performed to determine the differential adsorption of purified macromolecules to the patterns. If results from previous experiments demonstrate that combinations of proteins and SAMs are required for certain phenotypes, the possibility of adsorption of the macromolecule of interest to only the growth-promoting SAM can be determined. Imaging XPS can be used for these measurements.

After it is established that fidelity can be maintained (as illustrated for the DETA/13F combination in FIG. 1), the cells for MAP-2 and GAP-43 can be stained to check for neurite polarity. The patterned neurons can then be characterized morphologically, immunocytochemically, and by electrophysiological recordings to evaluate growth, transmitter, and epitope expression. The onset of synaptogenesis can also be investigated by staining for synaptophysin at various time intervals.

b. Alternative surfaces

If it is determined that SAMs alone are not suitable for long term pattern fidelity or for the generation of appropriate electrical signals, the attachment of additional biological marcomolecules to SAM-modified surfaces can be investigated. It has been shown that SAMs can be used as templates for further derivatization by charge-induced condensations [Decher et al. (1993)], heterobifunctional crosslinkers [Bhatia et al. (1989)], or simple adsorption. Such macromolecules include bovine serum albumin (BSA), laminin, tenascin, Neural Cell Adhesion Molecule (NCAM), L1, basic Fibroblast Growth Factor (bFGF), and several glycosaminoglycans (GAGs). The rationales for selecting these particular molecules are as follows:

(i) BSA: Albumin is a particularly prevalent protein in developing systems, and may play an important role in supporting the differentiation of embryonic cells [Dziegielewska et al. (1981); Adinolfi et al. (1977)]. In addition, it has been shown to prevent the non-specific adsorption of other proteins [U.S. Pat. No. 5,077,210].

(ii) Laminin, tenascin, and NCAM: Laminin has been shown to encourage neuronal growth [Engel, J. (1992)]. NCAM may be able to induce proliferation of neurons. Tenascin has been shown to be repulsive to neurons and glia [Hynes et al. (1992)], and may be useful in keeping cells off of certain regions of patterned surfaces.

(iii) Growth factors (bFGF, BDNF): Growth factors are used as signals to cells to develop or differentiate, but their exact function is not clear [Barde, Y. (1989); Thoenen, H. (1991)]. bFGF and BDNF have been shown to promote neuronal survival.

(iv) GAGs: These polysaccharides represent the other major class of extracellular macromolecules [Nagai et al. (1988); Letourneau, (1992)] that make up the ECM. GAGs that can be used include HS [Raff, M. (1992); Ruoslahti et al. (1994)], chondroitin sulfate, and hyaluronic acid.

If these biomolecules are found to be time-dependent for providing differentiation signals, a novel method of depositing biomolecules and making them available during culture can be employed. This has been designated Surface Protected Biosubstrates (SPB). The SPBs can be deposited during the fabrication of the patterned substrate but can be deprotected after the initial phases of cellular attachment and neurite outgrowth have taken place. The opportunity to add surface features after the early recognition events may be particularly advantageous for providing adhesive patterns for extensive synapse formation to occur. Recombinant or synthetic peptides with specific protease recognition sites engineered into the chimeric peptides may be developed. These chimeric peptides should consist of an adhesion domain adjacent to a non-adhesive-inhibitory domain. The adhesive domain would then be exposed by the release of the inhibitory domain by the sequence specific protease. This approach may require analysis of the chimeric peptides to identify non-adhesive domains that will efficiently block recognition of the adhesive domains. Based on our extensive investigation of the properties of silanes with different functional groups, we already have a basis for selecting sequences with inhibitory activity. Sequence specific protease technology is readily available and is currently in wide use in the purification of recombinant proteins.

c. Cell culture on silicon nitride

Once electrophysiological recordings from cells patterned on SAM-modified silica have been obtained, the patterning and recording experiments on modified $Si_3N_4$ surfaces can be repeated. Silicon nitride surfaces are preferably activated by exposure to an oxygen plasma. We have previously shown that cultured neurons have similar morphological properties when plated on SAM-modified glass and $Si_3N_4$.

d. Factors responsible for controlling synaptic connections

Development of the nervous system requires the extension from neuronal cell bodies of neurites, distinguished as either axons or dendrites which differ morphologically and functionally [Black et al. (1989); Dotti et al. (1988)]. It is well known that axons serve as information transmitters, propagating bioelectrical signals and releasing neurotransmitters at specialized terminal structures. In contrast, dendrites and cell bodies express neurotransmitter receptors permitting signal reception and integration.

While the mechanisms underlying the control of synaptogenesis are incompletely understood, the construction of model neuronal circuits which are stable and reproducible may depend on the ability to manipulate culture conditions or attach certain biological molecules to SAM-modified surfaces to modulate synaptogenesis. A number of molecules have been shown to influence synaptogenesis. Glutamate, the major excitatory neurotransmitter in the mammalian nervous system, appears to have a major role in synaptogenesis [Mattson et al. (1998a, 1998b)], perhaps by serving as a chemoattractant for the guidance of neuronal processes [Zheng et al. (1994)]. Glutamate released from neuronal growth cones stabilizes dendritic outgrowth and promotes axonal-dendritic synapse formation via activation of a specific class of glutamate receptors localized to dendrites [Mattson et al. (1991)]. Inhibition of synapsins I and II, phosphoproteins which interact with synaptic vesicles and mediate transmitter release, decreases the information and maintenance of synapses in hippocampal culture [Ferreira et al. (1995); Chin et al. (1995)]. NCAM is expressed concurrently with neurite extension and early stages of synaptogenesis [Alcantara et al. (1992)]. Removal of the polysialic acid portion of NCAM only delays synaptogenesis [Muller et al. (1994)], consistent with the notion that adhesion molecules probably do not play a critical role in synaptogenesis [Edelman, G. (1986)]. In contrast, the polypeptide bFGF has been shown to promote axonal bifurcation and growth of axonal branches while inhibiting dendrite outgrowth [Aoyagi et al. (1994)]. Attachment of bFGF to specific locations of the SAM-modified surface would be expected to promote axonal branching to reliably established multiple signal output pathways. Furthermore, one may take advantage of the observation that microtubule assembly influences neurite extension and architecture [Matus, A. (1988)]. Attachment of factors which specifically regulate tau protein, localized in axons, and MAP2, localized in dendrites [Caceres et al. (1986)] are also expected to facilitate circuit patterning.

One issue to be considered concerns the stability of a patterned neuronal circuit over the course of use. Recent work has demonstrated a prominent role for phospholipase $A_2$-derived arachidonic acid and lipoxygenase metabolites in both neurite outgrowth and retraction [Smallheiser et al. (1996)]. These data suggest a general role for arachidonic acid in the regulation of neuronal cytoskeleton remodeling which occurs during development and after injury. Therefore, it is contemplated that addition of phospholipase $A_2$ inhibitor, 4-bromophenacyl bromide, and/or the lipoxygenase inhibitor, AA861, will help maintain the stability of the neuronal circuit. These effects will be studied by addition to the culturing media.

II. The neuron—solid-state interface

A biological/silicon interface is the result of the outer membrane of a cell, e.g., the neuronal glycocalyx, being in contact with the chemically modified silicon dioxide surface. A neuron is a special case in that not only are adhesion and viability of the cell important, but so is the ability to detect the electrical signals generated by the neuron with the silicon-based device. These signals are capacitivity coupled to the surface so the signal falls as the neuron membrane moves further away. These signals can be detected in two ways: by capacitivity coupling to a FET, or by capacitivity coupling to a metal electrode.

a. Control protein build-up by neurons on surfaces

One of the problems observed in long-term neuronal and cell line culture is that a protein layer will build up over time with the thickness related to the initial surface composition and the culture conditions [Schaffner et al. (1995)]. This build-up can be monitored by XPS and ellipsometry and has been correlated to cell morphology and health. Extensive protein build-up, not only indicates stress in the cell but will also increase the distance from pickup to cell membrane. Hence, it is important to determine the amount of protein deposited during cell culture at different time periods and to determine the factors that contribute to protein buildup.

b. Construction of gigaohm seals on electrodes by surface modification

The closer a neuronal membrane is to a transducer the stronger the signal that can be detected. Patch-clamp recording works so well because a gigaohm seal is created between the surface of the cell and the electrode tip using a combination of a pressure differential and surface interactions. This gigaohm seal almost eliminates the flow of ions from the surrounding media and allows membrane potentials and even small amplitude channel activity to be monitored in response to stimuli. Likewise, tight binding of the neuronal cell surface to a artificially created surface over the pickup electrode can be promoted. A variety of biological molecules that have strong interactions including antibodies, receptor substrates, and molecules that have shown strong non-specific interactions, can be employed. We will monitor these results by electrophysiological recordings at metal electrodes and eventually at FET interfaces.

c. Control of placement of neurons on metals using surface chemistry

As mentioned previously, two different SAMs can segregate on two different surfaces from the same solution. This can also be done sequentially with certain materials and is how metal electrodes can be differently modified. The $Si_3N_4/SiO_2$ insulator can be modified with a silane then an Au microelectrode can be modified with a SAM that will promote cell body adhesion or provide anchors for biological materials that promote this interaction. The SAMs on Au are preferably thiols and there is an extensive literature on their interaction with various electronic materials [Ulman, A. (1991); Hickman et al. (1992)], and they have been further derivatized with biomolecules.

d. Solid-state systems

Figure 5:
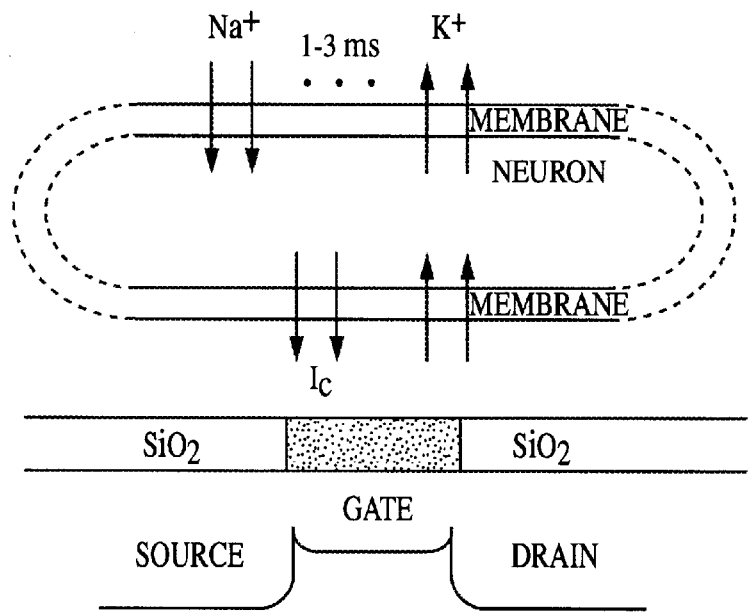
FIG. 5 illustrates a FET detection scheme according to the principles of the present invention.

Two transducers for the signals generated by the neurons ar described herein, but these are not the only candidates that can be considered. The FET detection mechanism and how it affects circuit design is shown in FIG. 5. The gate electrode contact is covered by a layer of $SiO_2$ and then a layer of $Si_3N_4$ that prevents diffusion of the ions from the growth medium into the electrical circuitry. During the initial phase of the propagation of the axon signal, the $Na^+$ channels open and $Na^+$ ions are transported across the membrane. $Na^+$ influx causes membrane depolarization, which over the region of the cellular membrane in contact with the FET gate electrode results in a capacitive discharge current given by $I_c=C_{jm} dV_m/dt$ where $C_{jm}$ is the junction-membrane capacitance and $V_m$ is the membrane potential. The fluctuation in charge polarization on the insulator over the gate pickup produces a voltage difference across the gate, which is then detected as a change in the source-drain current of the FET. Some time later, the $K^+$ channels open and $K^+$ ions flow in the reverse direction from the other side of the membrane, and a similar but opposite sign impulse is imparted to the gate electrode.

Figure 6:
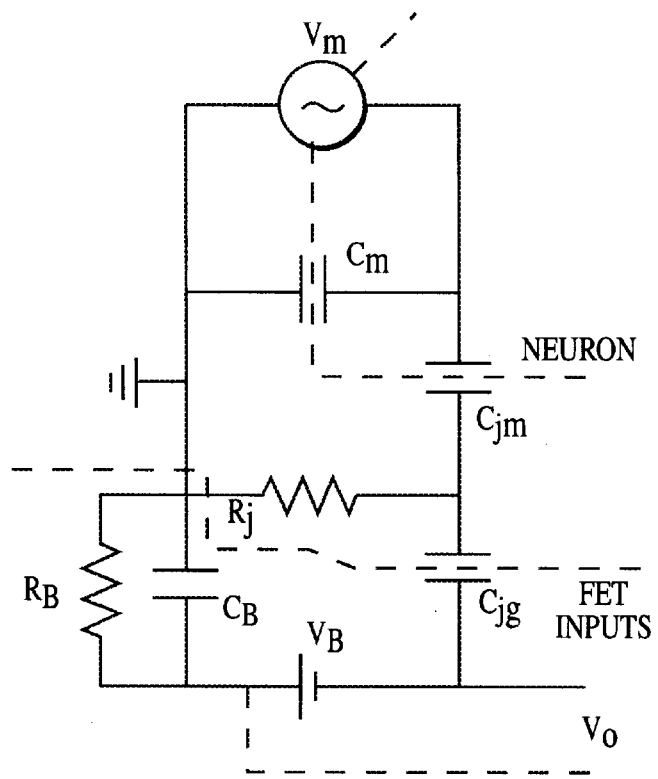
FIG. 6 illustrates an equivalent circuit for the neuron-FET interface adapted from Fromherz et al. (1991).

A preliminary circuit model of the detector shown in FIG. 5 is shown in FIG. 6. The circuit is essentially that described previously [Fromherz et al. (1991)] with the exception that the possible feedback paths of the bias voltage are explicitly shown. The membrane voltage, $V_m$, is taken to be an idealized AC source in parallel with the membrane capacitance, $C_m$. Any voltage appearing across the membrane appears across this capacitance in parallel with the junction-membrane capacitance $C_{jm}$. The signal then has the option of leaking to the outside world through the junction resistance, $R_j$ (which is substantially eliminated by providing a gigaohm seal), or coupling to the FET pickup through the junction-gate capacitance, $C_{jg}$. The pickup FET is explicitly shown, with the drain voltage signal taken out as a preamplified output signal. The circuit model also explicitly shows the possible feedback of the FET signal through a coupling capacitance and leakage resistance to the surrounding solution, which are shown as $C_B$ and $R_B$ respectively. It is strongly desirable to minimize the effects of $C_B$ and $R_B$ on the detected signals. This, in turn, drives the design of the overall package that will be immersed in the electrolyte solution.

There are several elements of the circuit in FIG. 6 that are amenable to electronic circuit design, electronic package design, and overall sensor design optimization. A simplified version is described here but a wide variation of options can be expected. The parameters of the FET itself are open to significant design tradeoffs of sensitivity, signal to noise ratio, input impedance, and frequency roll-off. The package design can take into account optimizations of the feedback parameters $C_B$ and $R_B$, as well as selection of where to take the "ground" line for the output signal $V_o$. Finally, selection of the appropriate package materials and surface processing of the cell-sensor junction can allow rational control of the junction leakage resistance, $R_1$, as well as the two junction capacitances, $C_{jm}$ and $C_{jg}$.

III. Characterization of neuronal circuit a. Dual patch-clamp electrode recording from single neurons and neuronal circuits After the surface has been patterned and phenotype differences identified on the surface, cells from two different embryonic days can be constructed an analyzed in simple two-cell circuits by intracellular electrophysiological recordings. These can be compared to the recordings made on unpatterned cells, both with and without obvious synaptic connections. Dual patch-clamp recordings from pairs of neurons are preferably employed. A first two-cell circuit can be on DETA/13F, and consists of two neurons derived from embryonic day 18 E18, and then two from E22 platings. The electrophysiological properties of hippocampal neurons can be compared at 7 days after plating and 21 days after plating. Other time points can be examined if necessary. Properties of the cells can then be studied as the cells grow in culture. The cells can be immunocytochemically stained for synaptophysin, and if mixed phenotype patterns from morphological observations are suspected, immunocytochemical staining for neurotransmitter type can be performed as well.

b. High-resolution imaging of circuit development

A second major type of approach to non-invasive cell recording involves optical methods. Like thin film electrode techniques, efforts also began in this area about twenty years ago and are based on the recording of membrane potential using voltage sensitive fluorescence or absorbance dyes. It is desirable to characterize electrochemical communication between neurons with a high degree of spatial and temporal resolution. Both are necessary to analyze the efficacy of synaptic communication between neurons on patterned substrates in a geometrically-dependent manner. Methods have existed for several decades to monitor the electrical activity of excitable cells using ampiphilic fluorescent molecules which intercalate into the lipid bilayer of the cell membrane. Changes in the potential across the cell membrane cause corresponding electric field changes across the lipid bilayer, affecting the fluorescence properties of the probe molecules. This is technically difficult to measure, since the fluorescence changes are on the order on one part per thousand of the total fluorescence signal. This is made more complicated by the fact that high levels of illumination have been necessary to produce adequate signal-to-noise ratios, producing a deleterious effect on the lifetime of the probes and adversely affecting cell viability.

Fortunately, the recent pace of improvement in this area has been remarkable. Hamamtsu Photonic Systems now manufactures an integrated system for measuring changes in the absorbance or fluorescence of membrane potential-sensitive dyes with temporal resolutions of several milliseconds, making it possible to monitor electrical activity of central neurons. A unique approach, involving microelectronic photonic sensor arrays, affords the ability to perform an analog differential absorbance/fluorescence measurement on-chip, outputting only the differential signal. This makes it unnecessary to capture an inordinate amount of high speed data and subtract a digitized background from a different region while the dye photoquenches. The present inventors have identified this optical measurement as enabling capability for recording from groups of neurons.

c. Surface analysis before and after cell culture

To relate the morphological, immunocytochemical, and electrical properties of cultured neurons to properties of the substrate, each SAM-modified surface should be characterized before each experiment by contact angle, and XPS if appropriate. Contact angle measurements are a way of quantitating the surface free energy of a modified surface. Characterizing surface hydrophobicity or hydrophilicity permits one to determine if relative hydrophobicity or functional group accessibility can be correlated to cell adhesion, growth, or phenotype. XPS is a technique for the elemental analysis and characterization of surfaces that permits determining if quantities such as starting density of functional groups or their oxidation states can be correlated to cell growth or phenotype.

The role of the surface in supporting neuronal growth can be further defined by determining if there are any reproducible changes in the amount, thickness, or distribution of macromolecules on the underlying SAMs after cell culture. Standard biochemical methods can be employed to determine if adsorbed proteins originate from the culture media or if they are excreted by the cells themselves. The emphasis should be on quantification of surface properties using quantitative XPS, imaging XPS, ellipsometry, SDS-PAGE, and RIA if appropriate.

d. Characterization of neuronal morphology

Neurons in culture can be characterized according to the several criteria described below. Cell survival and morphological characterization can be accomplished by photographing the culture dishes at 14 hours after plating. Cell survival can be assessed by a comparison of the number of cells surviving a given point relative to the number of cells surviving at the time of the culture initiation. Particular attention should be paid to the following three quantitative values:

(i) Extent of process formation and growth cone activity. Neurite outgrowth can be quantified by computing (a) the percentage of cells that produce neurites, (b) the total neurite length, (c) the number of primary neurites per cell, and (d) the length-frequency of branching on primary and higher-order neurites.

(ii) Cell-to-substrate surface contact area. The cell-to-substrate surface contact area of well separated cells can be measured by marking the cell boundaries on the image and calculating the enclosed areas. A more adhesive substratum will result in flatter, more adherent cells and thus a larger area in contact with the substratum.

(iii) Extent of aggregation. As a measure of migration and cell-cell adhesion, aggregation can be evaluated by measuring the total surface occupied by clusters or ganglion-like structures where contact inhibition has been lost.

To analyze this data the NIH IMAGE program developed by W. Rasband in the Research Services Branch, NIMH, NIH can be used. This program is in the public domain and allows one to (1) draw boundaries around cell somas or aggregates to calculate area or draw a boundary just outside the cell some to calculate intersections and determine the number of primary neurites, (2) draw the frequency histograms, and (3) do a chi-square analysis to determine whether distributions differ on each of the different SAMs. An analysis of variance should be done to determine if there are treatment differences as well as plate differences in order to determine the number of replicates necessary to generate statistically meaningful results.

e. Immunocytochemistry

In each study a representative coverslip is stained to determine the relative ratio of neurons to glia. This knowledge is important in determining if glial cells are present during cell culture since their relative number may influence the behavior of cultured neurons. Cells can be characterized immunocytochemically for neuron-specific antigens (neurofilament neuron-specific enolase, Tuj1), an astrocyte-specific antigen (glial fibrillary acidic protein, or GFAP), and an oligodendrocyte-specific antigen (galactocerebroside, or galc).

Neurons can be characterized with respect to neurotransmitter expression with commercially available antisera to the neurotransmitters GABA and glutamate. For instance, the immunocytochemistry experiments can be done at days 7 and 21 after plating. Potential synapse formation can be evaluated using standard immunostaining techniques to identify the synapse-specific protein, synaptophysin, [Buckley et al. (1985); Hall et al. (1993)]. The protocols have been established previously [Ma et al., 1992].

f. Characterization of the neuron-FET gate electrode interface

A key aspect of the present invention is the electrical characteristics of the neuron-gate interface. Characterization of the interface requires that the transmembrane potential of the neuron be controlled while measurement from the FET is acquired. With the use of the patch-clamp, voltage control can be achieved and the input-output relationships (spectral density and phase) can be derived by applying subthreshold amplitude sinusoidal voltage-clamp waveforms and measuring the FET output. Clearly, an ideal interface would cause no signal attenuation or phase shift; however, the capacitive coupling of the interface will undoubtedly impose a low-pass filtering characteristic. Thus, the spectral density and phase relations provide quantitative measures of the interface characteristics for comparison among various SAM or SAM-modified surface.

IV. Circuit device fabrication and characterization a. Specificity of synapse formation Standard protocols established previously can be used [Ma et al. 1992]. Once it is established that synaptophysin has been immunocytochemically detected, baseline properties can be recorded using whole cell patch clamp by stimulation and recording for subsequent patterning experiments. Dual patch-clamp recordings of presynaptic and postsynaptic neurons can be undertaken to examine the input-output relationships of the individual circuit models. Both spontaneous and evoked postsynaptic responses can be characterized, including stimulus intensity versus output curves. It is possible that SAMs (or SAMs plus adsorbed macromolecules) that allow optimal neuron survival are not those that encourage synapse formation, so this aspect may need to be investigated. It is also possible that synapses may form in the absence of a positive immunostaining response.

b. Structure of primary logic circuit devices

A goal of the neuronal circuit patterning methods described above is to provide circuit models consisting of two neurons, especially for their complete and reproducible characterization. Each circuit model, consisting of both an inhibitory and excitatory neuron, will vary in terms of the number and location of synaptic connections. Characterization of each neuronal model should include (1) examination of the time response of each circuit branch, (2) verification of the reproducibility of model network synaptic connections, and (3) verification of circuit behavior and properties over time in culture.

Five neuronal circuit models, each based on a pair of neurons, are described below which demonstrate the importance of the type and location of synaptic connections. It should be emphasized that implementation of these circuit models requires the ability to distinguish excitatory from inhibitory neurons from a mixed population during tissue dissociation and culture. There is evidence that inhibitory (GABA-ergic) hippocampal neurons exhibit morphological features distinct from excitatory (non-GABA-ergic) hippocampal neurons. For example, most GABA-ergic neurons have more polygonal-shaped cell bodies, non-spiny and less tapering dendrites, as well as fewer dendrites [Benson et al. (1994)]. Still, it is not certain that such morphological differences will be apparent under the culture conditions after attachment to SAM or SAM-modified surfaces. To address this concern, standard patterning techniques can be used to generate a large number of two neuron patterns on a single surface. Some significant fraction of the neuronal circuits can then be expected to exhibit the desired excitatory/inhibitory orientation. Individual circuits chosen from morphologic characteristics can be examined electrophysiologically and correlated with immunocytochemistry to verify the phenotype of the neurons within each patterned circuit.

Additionally, recording sites are depicted at axonal processes; however, this is not an absolute requirement because the soma are expected to provide similar output information. In fact, for preliminary analysis of the neuron-FET gate junction, patch clamp recordings of the axonal processes may prove prohibitively difficult. Therefore, it may be necessary to place the recording site at the some which could then be more readily compared with whole-cell recordings.

Figure 7B:
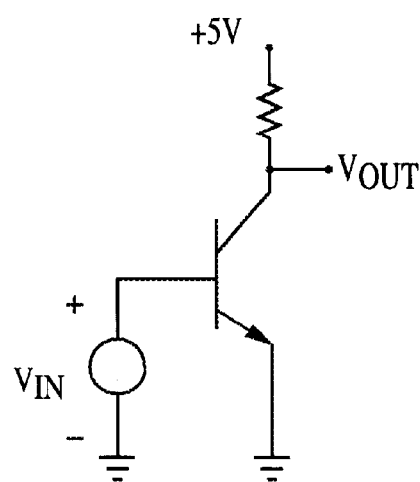
Figure 8A:
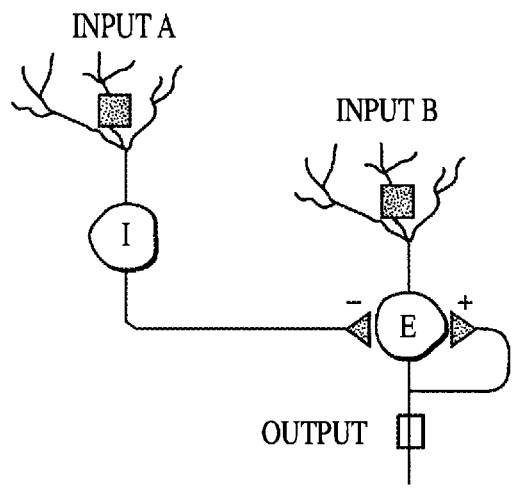
FIG. 8 illustrates four different circuit models according to the principles of the present invention.
Figure 8B:
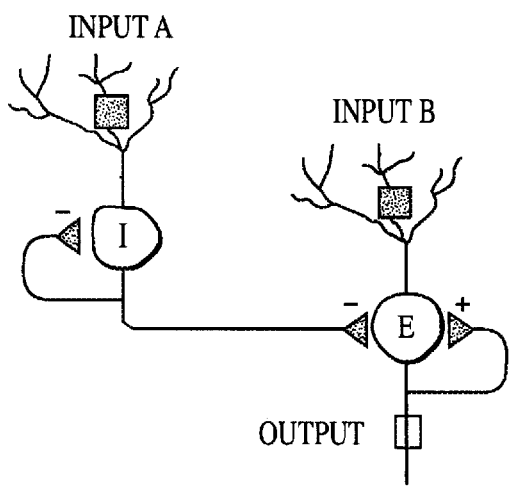
Figure 8C:
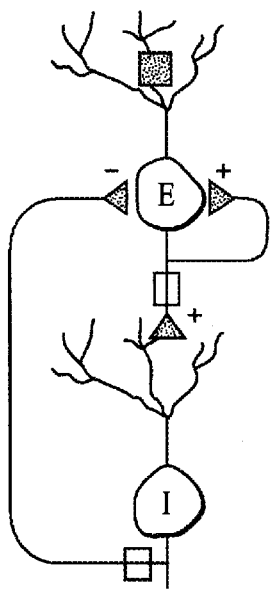
Figure 8D:
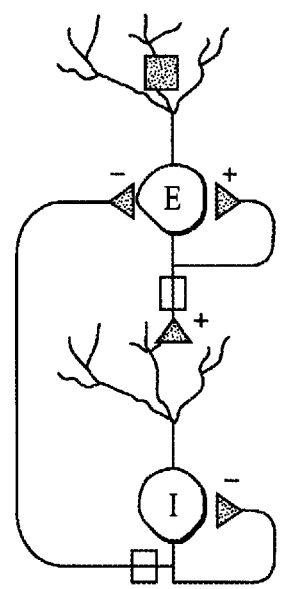

The first circuit model (FIG. 7A) consists of an inhibitory neuron forming a single synaptic connection on the cell body of the excitatory neuron. With appropriately chosen stimuli, this simple circuit can produce vary distinctive behavior, as demonstrated by the simulation efforts in FIG. 4B. For example, a constant stimulation train applied at input B would be gated based on the state of input A: stimulation of input A inhibitors the transmission of excitation whereas the lack of stimulation of input A permits the propagation of excitability. The behavior of this circuit model bears similarity to that of a simple transistor-logic circuit where the state of the transistor gate influences circuit output (FIG. 7B). Furthermore, this circuit model is the core element of a circuit to explain directional selectivity in the mammalian retina [Barlow et al. (1965)] and thalamocortical processing of visual information [Douglas et al. (1991a), (1991b)]. With a stimulus moving in the non-preferred direction (A to B), the inhibition decreases the excitability of the postsynaptic excitatory neuron whereas in the preferred direction, excitation passes freely [Anton et al. (1992)].

The second circuit model (FIG. 8A) extends the first model to include a positive feedback branch which allows excitation to persist after an initial stimulus at input B. Stimulation of input A then truncates the excitation train. The third circuit model (FIG. 8B) is also an extension of the first model including an autoinhibitory synapse to allow only a transient inhibition of the excitation train, in spite of continued stimulation of input A. The fourth circuit model (FIG. 8C), in response to stimulus, produces an excitatory output train which is then suppressed by the downstream inhibitory neuron. The length of the excitation train depends on the propagation delay of the inhibitory feedback loop. This particular neuronal model is the key component of a Winner-Take-All (WTA) circuit which has been characterized in Layer II olfactory complex [Van Hoesen et al. (1975)], cutaneous mechanoreception in skin [Gardner et al. (1989)], and may have an important role in perceptual decision making in primates [Salzmann et al. (1994)]. In addition, this circuit bears strong resemblance to the Renshaw cell-spinal motoneuron circuit, where activation of the motoneuron excites the inhibitory Renshaw cell which then slows or stops the discharge rate of the motoneuron [Van Keulen, L. (1979)]. The fifth neuronal circuit (FIG. 8D) extends the fourth model by including an autoinhibitory synapse to terminate the inhibitory feedback.

Figure 9:
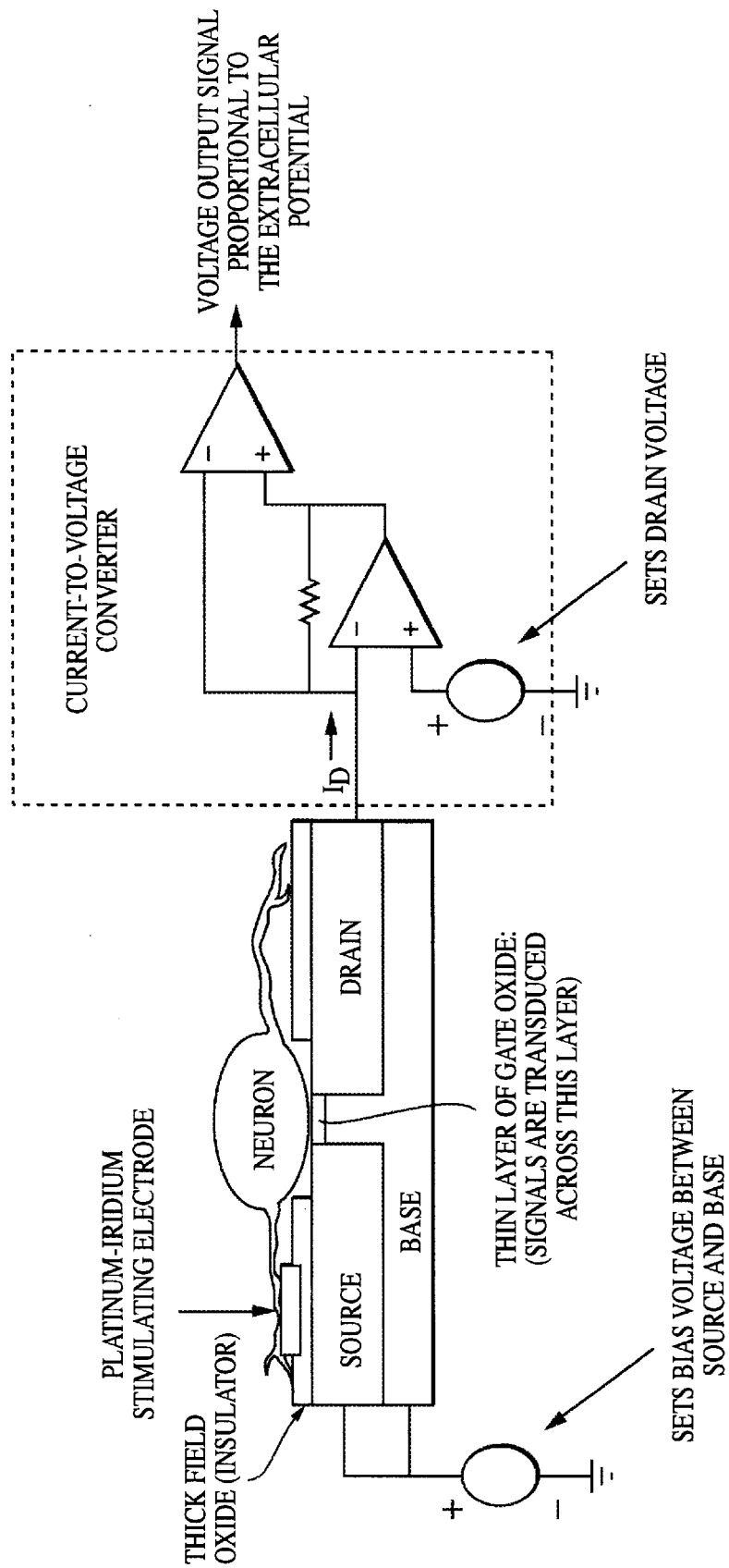
FIG. 9 illustrates in cross-section a detailed view of a neuroelectric component and associated circuitry according to the principles of the present invention.

A more detailed representation of an afore-mentioned neuroelectric component is depicted in FIG. 9. FIG. 9, post-neuronal circuitry for monitoring signals propagated through the neuron is depicted.

Figure 10:
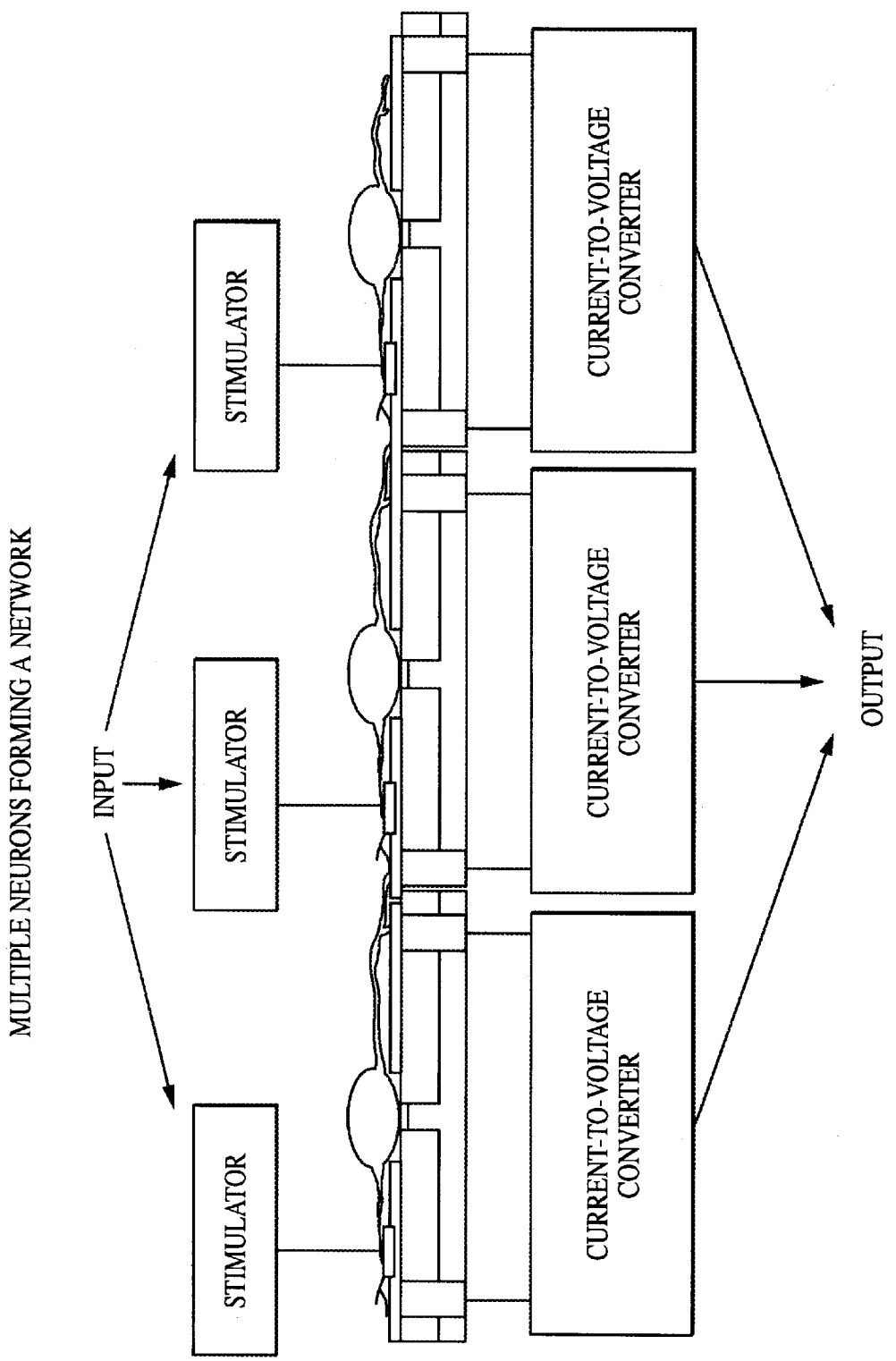
FIG. 10 depicts in cross-section a network of neuroelectric components in electrical communication with the output of each cell component monitored externally.

A network of three neuroelectric components arranged in series is depicted in FIG. 10, with the outputs of each component separately monitored and reported via current-to-voltage converters to an output means.

c. Construction of primary logic circuit devices

To examine the utility of a two-neuron logic circuit, the patch-clamp technique can be employed [Hamill et al. (1981]. Neurons patterned on a glass coverslip are transferred to a chamber mounted on an inverted microscope. Borosilicate patch electrodes fabricated with a two-stage puller and patch pipette tips are heat-polished to ensure a giga-ohm seal formation. The patch pipette internal filling solution contains (in mM): 140 KCl, 5 $MgCl_2$, 5 Na-adenosine triphosphate, 1 N-2-hydroxyethylpiperazine-N'-2 ethanesulfonic acid (HEPES), 1 ethylene glycol-bis($\beta$-aminoethyl ether)-N,N,N,N-tetraacetic acid, pH 7.3. The external bathing solution contains (in mM): 140 NaCl, 5 KCl, 2 $CaCl_2$, 1 $MgCl_2$, 10 HEPES, pH 7.4. With nearly equivalent extracellular and intracellular concentrations of chloride ions, the electrochemical driving force for chloride ions is approximately zero such that GABA-mediated inhibitory chloride ions is inward for cells voltage-clamped at negative potentials.

After identification of pairs of interconnected hippocampal neurons, the use of a dual patch clamp approach permits examination of transmitter release. One patch electrode can be used to monitor and stimulate the activity of the presynaptic cell in a current-clamp mode, yielding a measure of membrane potential. The other patch electrode is first used to record evoked inhibitory membrane currents, in voltage-clamp mode, at the postsynaptic neuron to verify transmission. After verification, the second electrode and amplifier are used in the current-clamp mode to stimulate repetitive firing. Intermittent current injection of the presynaptic neuron then terminates repetitive firing of the postsynaptic neuron. Stimulus intensity versus firing rate can be tabulated as well as reproducibility between neuronal pairs.

Figure 11:
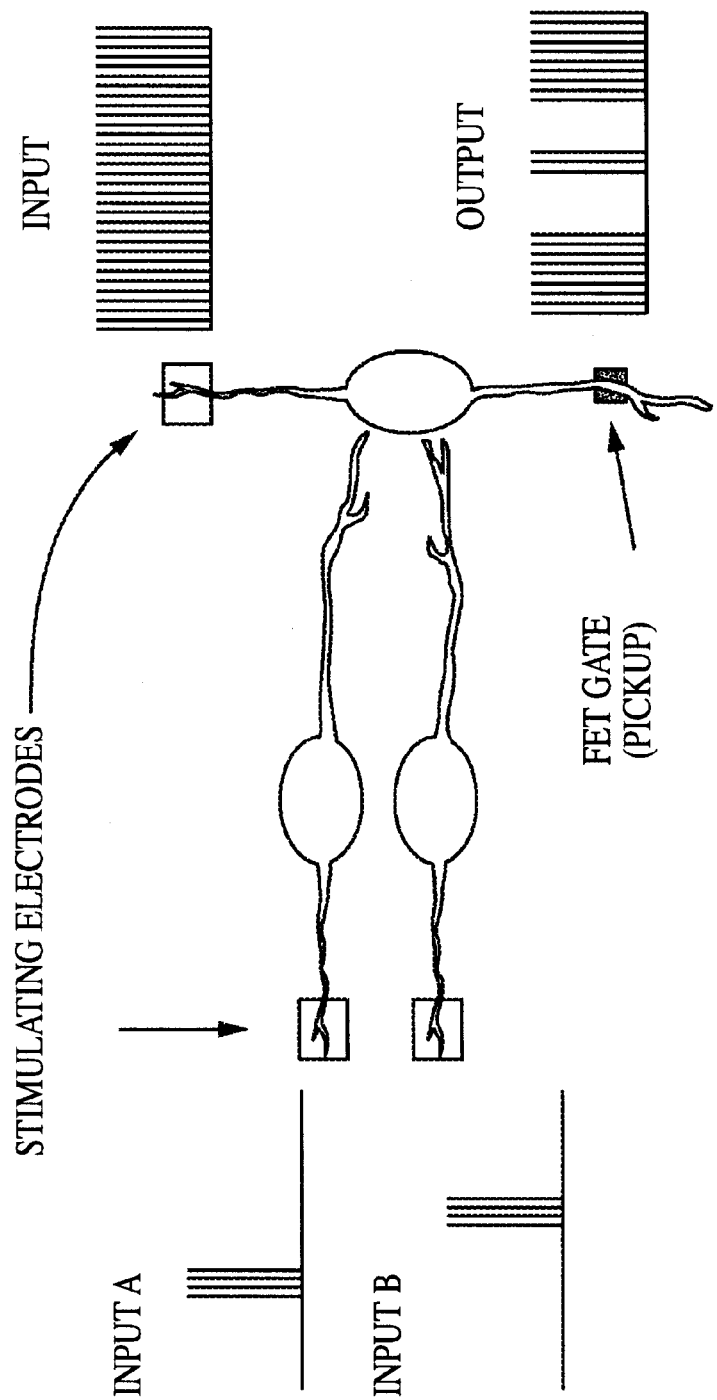
FIG. 11 illustrates a neuronal logic circuit composed of three neurons in which stimulation of two of the neurons at different times regulates a signal being propagated in the third neuron.

A signal pattern representative of the above construction in which two neurons are alternately stimulated to affect and alter current transmission in a stimulated third neuron is shown in FIG. 11.

The present invention has been described with reference to certain examples for purposes of clarity and understanding. It should be appreciated, however, that certain obvious additions and modifications can be practiced within the scope of the appended claims and equivalents thereof.

REFERENCES

The pertinent portions of the following references, which were discussed hereinabove, are incorporated herein by reference.

Adinolfi, M. and Haddad, S. A. (1977). Levels of plasma proteins in human and rat fetal CSF and the development of the blood-CSF barrier. *Neuropadiatrie* 8:345–353.

Adleman, L. (1994), Molecular Computation of Solutions to Combinatorial Problems. *Science* Vol. 266.

Alcantara, A. A., Pfenninger, K. H., and Greenough, W. T. (1992) 5B4-CAM expression parallels neurite outgrowth and synaptogenesis in the developing rat brain. *J.Comp.Neurol.*, 319:337–348.

Ambrose-Ingerson, J., Granger, R., and Lynch, G. (1990). *Science* 247: 1344–1348.

Anderson, J. M., Bonfield, T. L. and Ziats, N. P. (1990) Protein adsorption and cellular adhesion and activation on biomedical polymers. *Int.J.Artif. Organs*, 13:375–382.

Anderson, A. J., Pike, C. J. and Cotman, C. W. (1995). Differential induction of immediate early gene proteins in cultured neurons by $\beta$-amyloid: association of c-Jun with $\beta$-induced apoptosis. *J.Neurochem.* 65:1487–1498.

Anton, P. S. Granger, R., and Lynch, G. (1992) Temporal information processing in synapses, cells, and circuits. In Single Mount Computation. T McKenna, J. Davis, S. F. Zornetzger (eds.) Academic Press, San Diego, 291–314.

Aoyagi, A., Nichikawa, K., Saito, H., and Abe, K. (1994) Characterization of basic fibroblast growth factor-mediated acceleration of axonal branching in cultured rat hippocampal neurons. *Brain Res.* 661: 117–126.

Artola, A., and Singer, W. (1987) Long-termn potentiation and NMDA receptors in rat visual cortex. *Nature* 330: 649–652.

Artola, A., and Singer, W. (1990) The involvement of N-methyl-D-aspartate in rat visual cortex. *Eur. J. Neurosci.* 2: 254–269.

Banker, G. A. and Cowan, W. M. (1977). Rat hippocampal neurons dispersed in cell culture. *Brain Res.* 126: 397–425.

Barde, Y. A. (1989). Trophic factors and neuronal survival. *Neuron* 2: 1525–1534.

Barlow, H. B. and Levick, W. R. (1965) The mechanism of directionally selective units in the rabbit's retina. J. Physiol. (Lond.) 178: 477–504.

Barrows, G. Sciortino, J., Kowtha, V., and Stenger, D. A. (1996). NRL *Report* (No. pending).

Baszkin, A. and Boissonnade, M. M. (1993). Competitive adsorption of albumin against collagen at solution-air and solution-polyethylene interfaces. *J. Biomed. Mat. Res.* 27: 145–152.

Behar, T. N., Schaffner, A. E., Colton, C. A., Somogyi, R., Olah, Z., Lehal, C., and Barker, J. L. (1994). GABA-induced chemokinesis and NGF-induced chemotaxis of embryonic spinal cord neurons. *J. Neurosci.* 14: 29–38.

Benson, D. L. Watkins, F. H., Steward, O., and Banker, G. (1994) Characterization of GABAergic neurons in hippocampal cell cultures. *J. Neurocytol.* 23: 279–295.

Bhatia, S. K., Hickman, J. J., and Ligler, F. S. (1992). New approach to producing patterned biomolecular assemblies. *J. Am. Chem. Soc.* 114: 4432–4433.

Black, M. M. and Baas, P. W. (1989) The basis of polarity in neurons. *Trends Neurosci.* 12: 211–214.

Bonfield, T. L., Colton, E., and Anderson, J. M. (1992). Protein adsorption of biomedical polymers influences activated monocytes to produce fibroblast stimulating factors. *J. Biomed. Mat. Res.* 26: 457–465.

Brash, J. L. (1991). Role of Plasma Protein Adsorption in the Response of Blood to Foreign Surfaces. In C. P. Sharma and M. Szycher (Eds.), *Blood Compatible Materials and Devices* pp. 3–24, (Technomic Publishing Co., Inc.: Lancaster, Pa.).

Brewer, G. J. and Cotman, C. W. (1989). Survival and growth of hippocampal neurons in defined medium at low density: advantages of a sandwich technique or low oxygen. *Brain Res.* 494: 65–74.

Briggs, M. P. and Seah, M. P. (1992). *Practical Surface Analysis by Auger and X-ray Photoelectron Spectroscopy*, 2nd Ed. (John Wiley & Sons: New York).

Buckley, K. and Kelly, R. B. (1985). Identification of transmembrane glycoprotein specific for secretary vesicles of neural endocrine cells. *J. Cell Biol.* 100: 1284–1294.

Caceres, A., Banker, G. A., and Binder, L. (1986) Immunocytochemical localization of tubulin and microtubule-associated protein 2 during the development of hippocampal neurons in culture. *J. Neurosci.* 6: 714–722.

Chin, L.-S, Li, L., Ferreira, A. Kosik, K. S., and Greengard, P. (1995) Impairment of axonal development and of synaptogenesis in hippocampal neurons of synapsin-I-deficient mice. *Proc. Natl. Acad. Sci. U.S.A.* 92: 9230–9234.

Cooper, A., Munden, H. R., and Brown, G. I. (1976). The growth of mouse neuroblastoma cells in controlled orientations on thin films of silicon monoxide. *Exp Cell Res.* 103: 435–4539.

Corey, J. M., Wheeler, B. C., and Brewer, G. J. (1991). Compliance of hippocampal neurons to patterned substrate networks. *J. Neurosci. Res.* 30: 300–307.

Curtis, A. Wilkinson, C., and Breckenridge, J. (1994). "Living nerve net." In: *Enabling Technologies for Culture Neural Networks*, Eds.: D. Stenger and J. Hickman p. 99–120.

Decher, G. and Schmitt, J. (1993). Fine tuning of the film thickness of ultrathin multilayer films composed of consecutively alternating layers of anionic and cationic polyelectrolyes. Accepted for publication in *Coll. Poly. Sci.*

DeLorey, T. M. and Olsen, R. W. (1994). *Basic Neurochemistry*, eds. Siegel, G. J., Agranoff, B. W., Albers, R. W. and Molinoff, P. B. (Raven Press, New York), pp. 389–428.

Dotti, C. G., Sullivan, C. A., and Banker, G. A. (1988) The establishment of polarity by hippocampal neurons in culture. *J. Neurosci.* 8: 1454–1468.

Douglas, R. J. and Martin, K. A. C. (1991a) A functional microcircuit for cat visual cortex. *J. Physiol.* (*Lond.*) 440: 735–769.

Douglas, R. J., Martin, K. A. C., and Whitteridge, D. (1991b) An intracellular analysis of the visual responses of neurons in cat visual cortex. *J. Physiol.* (*Long.*) 440: 735–769.

Dulcey, C. S., Gregor, J. H., Krauthamer, V., Stenger, D. A., Fare, T. L., and Calvert, J. M. (1991). Deep UV photochemistry of chemisorbed monolayers: Patterned coplanar molecular assemblies. *Science* 252: 551–554.

Dziegielewska, K. M., Evans, C. A. N., Lai, P. C. W., Lorscheider, F. L., Malinowska, D. H., Mollgard, K., and Saunders, N. R. (1981). Proteins in cerebrospinal fluid and plasma of fetal rats during development. *Devel. Biol.* 83: 193–200.

Edelman, G. M. (1986) Cell adhesion molecules in the regulation of animal form and tissue pattern. *Annu. Rev. Cell. Biol.* 2:81–116.

Engel, J. (1992). Laminins and Other Strange Proteins. *Biochemistry* 31: 10643–10651.

Erb, R. J. (1993). Introduction to backpropagation neural network computation. *Pharm.Res.,* 10:165–170.

Ferreira, A., Han, H.-Q., Greengard, P., and Kosik, K. S. (1995) Suppression of synapsin II inhibits the formation and maintenance of synapses in hippocampal culture. *Proc. Natl. Acad. Sci. U.S.A.* 92: 9225–9229.

Fraaije, J. G., Norde, W., and Lyklema, J. (1991). Interfacial thermodynamics of protein adsorption and ion-coadsorption. III. Electrochemistry of bovine serum albumin adsorption on silver iodide. *Biophys. Chem.* 41: 263–276.

Friedlander, D. R., Milev, P., Karthikeyan, L., Margolis, R. K., Margolis, R. U., and Grumet, M. (1994). The neuronal chondroitin sulfate proteoglycan neurocan binds to the neural cell adhesion molecules ng-CAM/L1/MILE and N-CAM, and inhibits neuronal adhesion and neurite outgrowth. *J. Cell Biology* 125: 669–680.

Fromherz, P., Offenhausser, A., Vetter, T., and Weis, J. (1991). A neuron-silicon junction: A Retzuis cell of the leech on an insulated-gate field-effect transistor. *Science.* 252: 1290–1293.

Gardner, E. P. and Palmer, C. I. (1989) Stimulation of motion on the skin II. cutaneous mechanoreceptor coding of the width and texture of bar patterns displaced across the OPTACON. *J. Neurophysiol.* 62: 1437–1460.

Georger, Jr., J. H. Stenger, D. A., Rudolph, A. S., Hickman, J. J., Dulcey, C. S., and Fare, T. L. (1992). Coplanar patterns of self-assembled monolayers for selective cell adhesion and growth. *Thin Solid Films* 210/211: 716–719.

Ghosh, A., Carnahan, J., and Greenberg, M. E. (1994). Requirement for BDNF in Activity-Dependent Survival of Cortical Neurons. *Science* 263: 1618–1623.

Goodman, S. L., Cooper. S. L., and Albrecht, R. M. (1991). The effects of substrate-adsorbed albumin on platelet spreading. *J. Biomater. Sci. Polymer Edn.* 2: 147–159.

Granger, R., Ambros-Ingerson, J., Anton, P. S., Whitson, J., and Lynch, G. (1991). *An Introduction to Neural and Electronic Networks,* eds. Zornetzer, S. F., Davis, J. L., and Lau, C. (Academic Press, Inc., San Diego), pp. 25–42.

Gross, G. W. (1994). Simplified systems in cell culture: Rationale and significance. *Enabling Technologies for Cultured Neural Networks*, eds. Stenger, D. A. and McKenna, T. M. pp. 277–317.

Hall, Z. W. and Sanes, J. R. (1993). Synaptic structure and development: The neuromuscular junction. *Cell* 72 (Suppl.), 99–121.

Hamill, O. P., Marty, A., Neher, E., Sakmann, B., and Sigworth, F. J. (1981). Improved patch-clamp techniques for high resolution current recording from cells and cell-free membrane patches. *Pflugers Arch.,* 391:85–100.

Hammerback, J. A., Palm, S. A., Furcht, L. T., and Letourneau, P. C. (1985). Guidance of neurite outgrowth by pathways of substratum-adsorbed laminin. *J. Neurosci. Res.* 13: 213–220.

Hermansson, J., Lindberg, U., Hok, B., and Palmskog, G. (1991). Wetting properties of silicon surfaces. *Digest of Technical Papers, Transducers '91.* p. 193–196.

Hickman, J. J., Zou, C., Ofer, D., Harvey, P. D., Wrighton, M. S., Laibinis, P. E., Bain, C. D., and Whitesides, G. M. (1989). Combining spontaneous molecular assembly with microfabrication to pattern surfaces: Selective binding of isonitriles to platinum microwires and characterization by electrochemistry and surface spectroscopy. *J. Am. Chem. Soc.* 111: 7271.

Hickman, J. J., Ofer, D. Laibinis, P. E., Whitesides, G. M. and Wrighton, M. S. (1991a). Molecular self-assembly of two-terminal, voltammetric microsensors with internal references. *Science* 252: 688–691.

Hickman, J. J., Ofer, D. Zou, C., Wrighton, M. S., Laibinis, P. E., and Whitesides, G. M. (1991b). Selective functionalization of gold microstructures with ferrocenyl derivatives via reaction with thiols or disulfides: Characterization by electrochemistry and Auger electron spectroscopy. *J. Am. Chem. Soc.* 113: 1128.

Hickman, J. J., Laibinis, P. E., Auerbach, D. I. Zou, C., Gardner, T. J. Whitesides, G. M., and Wrighton, M. S. (1992). Toward orthogonal self-assembly of redox active molecules on Pt and Au: Selective reaction of disulfide with Au and isonitrile with Pt. *Langmuir* 8: 357.

Hickman, J. J., Testoff, M. A., Stenger, D. A., Spargo, B. J., Rudolph, A. S., and Chu, C. C. (1993). Surface characterization of bioadsorbable polymers modified with self-assembled monolayers. *ACS Symposium Series.*

Hickman, J. J., Bhatia, S. K., Quong, J. N., Shoen, P., Stenger, D. A., Pike, C., and Cotman, C. W. (1994). Rational Pattern Design for in vitro Cellular Networks Using Surface Photochemistry, *J. Vac. Sci. Tech. A* 12(3): May/June.

Hubbell, J. A., Massia, S. P., Desai, N. P., and Drumheller, P. D. (1991). Endothelial cell-selective materials for tissue engineering in the vascular graft via a new receptor. *Bio/Technol.* 9: 568–572.

Hynes, R. O. and Lander, A. D. (1992). Contact and adhesive specificities in the associations, migrations, and targeting of cells and axons. *Cell* 68: 303–322.

Ip, N. Y., Li, Y., van de Stadt, I., Panayotatos, N., Alderson, R. F., and Lindsay, R. M. (1991). *J. of Neurosci.* 11: 3124–3134.

Johansson, S., and Arhem, P. (1990) Graded action potentials in small cultured rat hippocampal neurons. *Neurosci. Lett.* 118: 155–158.

Jones, K. R., Farinas, I., Backus, C., and Reichardt, L. F. (1994). Targeted disruption of the BDNF gene perturbs brain and sensory neuron development but not motor neuron development. *Cell:* 76: 989–999.

Juusola, M., French, A. S., Uusitalo, R. O., and Weckstrom, M. (1996) Information processing by graded-potential transmission through tonically active synapses. *Trends Neurosci.* 19: 292–297.

Kleinfeld, D., Kahler, K. H., and Hockberger, P. E. (1988). Controlled outgrowth of dissociated neurons on patterned substrates. *J. Neurosci.* 8: 4098–4120.

Kowtha, V. C., Satyanarayana, P., Gardner, R., and Stenger, D. A. (1995). *The neurobiology of computation,* ed. Bower, J. M. (Kluwer Academic Publishers, Boston).

Laibinis, P. E., Hickman, J. J., Wrighton, M. S., and Whitesides, G. M. (1989). Orthogonal self-assembled monolayers: Alkanethiols on gold and alkane carboxylic acids on alumina. *Science* 245: 845–847.

Lee, S. H. and Ruckenstein, E. (1988). Adsorption of proteins onto polymeric surfaces hydrophilicites—a case study with bovine serum albumin. *J. Colloid Interf.* 125: 365–379.

Leonard, E. F. and Vroman, L. (1991). Is the Vroman effect of importance in the interaction of blood with artificial materials? *J. Biomater. Sci. Polymer End.* 3: 95–107.

Letourneau, P. C., Condic, M. L., and Snow, D. M. (1992). Extracellular matrix and neurite outgrowth. *Curr. Opinion Genet. Develop.* 2: 625–634.

Lewandowska, K., Balachander, N., Sukenik, C. N., and Culp, L. A. (1989). Modulation of fibronectin adhesive functions for fibroblasts and neural cells by chemically derivatized substrata. *J. Cell Physiol.* 141: 334–345.

Ligler, F. S., Calvert, J. M., Georger, J. H., Shriver-Lake, L. C., Bhatia, S. K., and Bredehorst, R. U.S. Pat. No. 5,077,210 (1991).

Lom, B., Healy, K. E., and Hockberger, P. E. (1988). Controlled outgrowth of dissociated neurons on patterned substrates. *J. Neurosci.* 8: 4098–4120.

Lom, B., Healy, K. E., and Hockberger, P. E. (1993). A versatile technique for patterning biomolecules onto glass coverslips. *J. Neurosci. Meth.* 50: 385–397.

Lopez, G. P., Albers, M. W., Schreiber, S. L., Carroll, R., Peralta, E., and Whitesides, G. M. (1993). Convenient methods for patterning the adhesion of mammalian cells to surfaces using self-assembled monolayers of alkanethiolates on gold. *J. Am. Chem. Soc.* 115: 5877–5878.

Ma, W., Behar, T., Maric, D., Maric, I. and Barker, J. L. (1992). Neurospithelial cells in the rat spinal cord express glutamate decarboxylase immunoreactivity in vivo and in vitro. *J.Comp.Neurol.,* 325:257–270.

Maric, I., Maric, D., and Barker, J. L. (1994). *Enabling technologies for cultured neural networks,* eds. Stenger, D. A. and McKenna, T. M. (Academic Press, San Diego), pp. 23–33.

Massia, S. P. and Hubbell, J. A. (1991). An RGD spacing of 440 nm is sufficient for integrin, $ab_3$-mediated fibroblast spreading and 140 nm for focal contact and stress fiber formation. *J. Cell Biol.* 114: 1089–1100.

Mateo, N. B. and Ratner, B. D. (1989). Relating the surface properties of intraocular lens materials to endothelial cell adhesion damage. *Invest. Opthalm. Vis. Sci.* 30: 853–860.

Matsuda, T., Sugawara, T., and Inoue, K. (1992). An artificial neural circuit based on surface microphotoprocessing. *ASAIO J.* 38: M243–M247.

Mattson, M. P., Dou, P., and Kater, S. B. (1988a) Outgrowth-regulating actions of glutamate in isolated hippocampal pyramidal neurons. *J. Neurosci.* 8: 2087–2100.

Mattson, M. P., Lee, R. E., Adams, M. E., Guthrie, P. B., and Kater, S. B., (1988b) Interactions between entorinal axons and target hippocampal neurons: a role for glutamate in the development of hippocampal circuitry. *Neuron* 1: 865–876.

Mattson, M. P., Wang, H., and Michaelis, E. K. (1991) Developmental expression, compartmentalization, and possible role in excitoxicity of a putative NMDA receptor protein in cultured hippocampal neurons. *Brain Res.* 565: 94–108.

Matus, A. (1988). Microtubule-associated proteins: their potential role in determining neuronal morphology. *Ann. Rev. Neurosci.* 11:29–44.

Muller, D., Stoppini, L., Wang, C., and Kiss, J. Z. (1994) A role for polysialylated cell adhesion methods in lesion-induced sprouting in hippocampal organotypic cultures. *Neuroscience* 61: 441–445.

Nagai, Y. and Tsuji, S. (1988). "Cell biological significance of gangliosides in neuronal differentiation and development: Critique and proposals." In: Ledeen, R. W., Hogan, E. L., Tettamanti, G., Yates, A. J., and Yu, R. K. (Eds.), *New Trends in Ganglioside Research,* pp. 1329–1350 (Liviana Press: Padova).

Nisonoff, A. (1984). *Introduction to Molecular Immunology* (2nd ed.) Sinauer Associates, Inc.: Sunderland, Mass.).

Prime, K. L. and Whitesides, G. M. (1991). Self-assembled organic monolayers: Model systems for studying adsorption of proteins at surfaces. *Science* 252: 1164–1167.

Pusineri, C. and Cazenave, J. P. (1986). Adsorption at interfaces. In J. P. Cazenave, J. A. Davies, M. D. Kazatchkine, and W. G. van Aken (Eds.), *Blood-Surface Interactions* pp. 45–59 (Elsevier: Amsterdam).

Raff, M. C. (1992). Social controls on cell survival and cell death. *Nature.* 356: 397–400.

Reichardt, L. F. (1988). Extracellular matrix and cell surface interactions. *Neural Regeneration Res.* 119–125.

Ruoslahti, E. and Reed, J. C. (1994). Anchorage dependence, integrins, and apoptosis. *Cell* 77: 477–8.

Salzmann, C. D. and Newsome, W. T. (1994) Neural mechanism for forming a perceptual decision. *Science* 264: 231–237.

Sandwick, R. K. and Schray, K. J. (1988). Conformational states of enzymes bound to surfaces. *J. Coll. Interface Sci.* 121: 1–12.

Schaffner, A. E., St. John, P. A., and Barker, J. L. (1987). Fluorescence-activated cell sorting of embryonic mouse and rate motoneurons and their long-term survival in vitro. *J. Neurosci.* 7:3088–3104.

Schaffner, A. Barker, J. L., Stenger, D. A., and Hickman, J. (1995). Investigation of the factors necessary for growth of hippocampal neurons in a defined system. *J. Neurosci. Methods,* 62:111–119.

Singhvi, R., Kumar, A., Lopez, G. P., Stephanopoulos, G. N., Wang, D. I. C., Whitesides, G. M., and Ingber, D. E. (1994). Engineering cell shape and function. *Science,* 264: 696–698.

Smallhieser, N. R., Dissanayake, S., and Kapil, A. (1996) Rapid regulation of neurite outgrowth and retraction by phospholipase $A_2$-derived arachidonic acid and its metabolites. *Brain Res.* 721: 39–49.

Spargo, B. J., Testoff, M. A., Neilsen, T. B., Stenger, D. A., Hickman, J. J., and Rudolph, A. S. (1994). Adhesion, spreading, and differentiation of endothelial cells on self-assembled amino- and perfluoro-alkylsilane monolayers. Accepted for publication in *Proc. Natl. Acad. Sci.* USA.

Stemple, D. L. and Anderson, D. J. (1992). Isolation of a stem cell for neurons and glia from the mammalian neural crest. *Cell* 71: 973–985.

Stenger, D. A., Georger, J. H., Dulcey, C. S., Hickman, J. J., Rudolph, A. S., Nielsen, T. B., McCort, S. M., and Calvert, J. M. (1992). Coplanar molecular assemblies of amino and perfluorinated alkylsilanes: Characterization and geometric definition of mammalian cell adhesion and growth. *J. Am. Chem. Soc.* 114: 8435–8442.

Stenger, D. A., Pike, C., Hickman, J. J., and Cotman, C. W. (1993). Surface determinants of neuronal survival and growth on self-assembled monolayers in culture. *Brain Res.* 630: 136–147.

Strong, M. J. and Garruto, R. M. (1989). Isolation of fetal mouse motor neurons on discontinuous Percoll gradients. *In vitro Cell. Dev. Biol.* 25: 939–945.

Thimm, G., Moerland, P. and Fiesler, E. (1996). The interchangeability of learning rate and gain in backpropagation neural networks. *Neural Comput.,* 8:451–460.

Thoenen, H. (1991). The changing scene of neurotrophic factors. *TINS* 14: 165–170.

Torimitsu, K. and Kawana, A. (1990). Selective growth of sensory nerve fibers on metal oxide pattern in culture. *Dev. Brain Res.* 51: 128–131.

Traub, R. D., Wong, R. K. S., Miles, R., and Michelson, H. (1991). A model of a CA3 hippocampal neuron incorporating voltage-clamp data on intrinsic conductances. *J. Neurophysiol.* 66: 635–650.

Ulman, A. (1991). *Introduction to Ultrathin Organic Films* (Academic Press, Inc.: San Diego, Calif.).

Van Hoesen, G. and Pandya, D. (1975) Some connections of the entorhinal (area 28) and perirhinal (area 35) cortices of the rhesus monkey: I. temporal lobe afferents. *Brain Res.* 95: 1–24.

Van Keulen, L. (1979) Axon projections of Renshaw cells in the lumbar spinal cord of the cat, as reconstructed after intracellular staining with horseradish peroxidase. *Brain Res.* 167: 157–162.

Van Loosdrecht, M. C. M., Lyklema, J., Norde, W., and Zehnder, AJB (1990). Influence of interfaces on microbial activity. *Microbiol. Rev.* 54: 75–87.

Vargo, T. G., Thompson, P. M., Gerenser, L. J., Valentini, R. F., Aebischer, P., Hook, D. J., and Gardella, Jr., J. A. (1992). Monolayer chemical lithography and characterization of fluoropolymer films. *Langmuir* 8: 130–134.

Vroman, L., Adams, A. L. Klings, M., Fischer, G. C., Munoz, P. C., and Solensky, R. P. (1977). Reactions of formed elements of blood and plasma proteins at interfaces. *Annals N.Y. Acad. Sci.* 283: 65–76.

Wilson, M. A., Bhalla, U., Uhley, J. D., and Bower, J. M. (1989) GENESIS: A system for simulating neural networks. In: Advances in Neural Information Processing Systems. D. Touretzky (ed.) Morgan Kaufman, San Mateo, Calif., pp. 485–492.

Zheng, J. Q., Felden, M., Connor, J. A., and Poo, M. A. J. (1994) Turning of growth cones induced by neurotransmitters. *Nature* 368: 140–144.

Ziats, N. P., Miller, K. M., and Anderson, J. M. (1988). In vitro and in vivo interactions of cells with biomaterials. *Biomaterials* 9: 5–13.

What is claimed is:

1. A neuroelectric device comprising:

a substrate;

a neuron provided in a predefined orientation on at least a portion of the substrate;

a stimulator adjacent the neuron and capable of establishing a signal therein; and a transducer adjacent the neuron, which is capable of detecting the signal established in the neuron.

2. The neuroelectric device of claim 1, wherein a gigaohm seal is provided between the neuron and the substrate.

3. The neuroelectric device of claim 1, wherein a self-assembled monolayer is provided on the substrate in a predefined pattern, and the neuron is provided thereon.

4. The neuroelectric device of claim 3, wherein a cell-repulsive surface is provided at the periphery of the self-assembled monolayer.

5. The neuroelectric device of claim 3, wherein the self-assembled monolayer is composed of trimethoxysilyl-propyl diethylene tetraamine (DETA).

6. The neuroelectric device of claim 1, wherein the neuron is a hippocampal neuron.

7. The neuroelectric device of claim 1, wherein the stimulator is an electrode.

8. The neuroelectric device of claim 1, wherein the stimulator is formed in the substrate.

9. The neuroelectric device of claim 1, wherein the transducer is formed in the substrate.

10. The neuroelectric device of claim 1, wherein the transducer comprises a field effect transistor.

11. A neuroelectric logic device comprising:

a substrate;

first and second neurons provided on at least a portion of the substrate;

a first stimulator adjacent the first neuron and capable of establishing a signal therein;

a second stimulator adjacent the second neuron and capable of establishing a signal therein; and a transducer adjacent the second neuron, which is capable of detecting the signal established therein, said neurons being in synaptic relationship so that a signal established in the second neuron can be attenuated upon stimulation of the first neuron.

12. The neuroelectric logic device of claim 11, wherein a self-assembled monolayer is provided on the substrate in a predefined pattern, and said neurons are provided thereon.

13. The neuroelectric logic device of claim 11, wherein said first and second stimulators are electrodes.

14. The neuroelectric logic device of claim 11, wherein said transducer comprises a field effect transistor.

15. The neuroelectric logic device of claim 11, further comprising:

a third neuron provided on at least a portion of the self-assembled monolayer; and a third stimulator adjacent the third neuron which is capable of establishing a signal therein, said third neuron being in synaptic relationship with the second neuron so that a signal established in the second neuron can be attenuated upon stimulation of the third neuron.

* * * * *